United States Patent [19]
Stamm et al.

[11] Patent Number: 5,404,483
[45] Date of Patent: Apr. 4, 1995

[54] PROCESSOR AND METHOD FOR DELAYING THE PROCESSING OF CACHE COHERENCY TRANSACTIONS DURING OUTSTANDING CACHE FILLS

[75] Inventors: Rebecca L. Stamm, Wellesley, Mass.; Ruth I. Bahar, Lincoln, Nebr.; Nicholas D. Wade, Folsom, Calif.

[73] Assignee: Digital Equipment Corporation, Maynard, Mass.

[21] Appl. No.: 902,156

[22] Filed: Jun. 22, 1992

Related U.S. Application Data

[63] Continuation-in-part of Ser. No. 547,699, Jun. 29, 1990, and Ser. No. 547,597, Jun. 29, 1990, Pat. No. 5,155,843.

[51] Int. Cl.$^6$ .................... G06F 12/00; G06F 13/00
[52] U.S. Cl. .................... 395/425; 364/DIG. 1; 395/725
[58] Field of Search ............. 395/400, 425, 725

[56] References Cited

U.S. PATENT DOCUMENTS

| | | | |
|---|---|---|---|
| 4,142,234 | 2/1979 | Bean et al. | 395/425 |
| 4,195,340 | 3/1980 | Joyce | 395/425 |
| 4,197,580 | 4/1980 | Chang et al. | 395/425 |
| 4,410,944 | 10/1983 | Kronies | 395/425 |
| 4,445,174 | 4/1984 | Fletcher | 395/425 |
| 4,502,110 | 2/1985 | Saito | 395/425 |
| 4,527,238 | 7/1985 | Ryan et al. | 395/425 |
| 4,587,610 | 5/1986 | Rodman | 395/400 |
| 4,622,631 | 11/1986 | Frank et al. | 395/800 |
| 4,654,819 | 3/1987 | Stiffler et al. | 395/425 |
| 4,768,148 | 8/1988 | Keeley et al. | 395/425 |
| 4,858,111 | 8/1989 | Steps | 395/425 |
| 4,858,116 | 8/1989 | Gillett, Jr. et al. | 395/325 |
| 4,875,155 | 10/1989 | Iskiyan et al. | 395/425 |
| 4,875,160 | 10/1989 | Brown, III | 395/375 |
| 5,016,168 | 5/1991 | Liu | 395/375 |
| 5,045,996 | 9/1991 | Barth et al. | 395/425 |
| 5,155,843 | 11/1992 | Stamm et al. | 395/575 |
| 5,222,224 | 6/1993 | Flynn et al. | 395/425 |
| 5,226,143 | 7/1993 | Baird et al. | 395/425 |
| 5,226,144 | 7/1993 | Moriwaki et al. | 395/425 |
| 5,228,136 | 7/1993 | Shimizu et al. | 395/425 |
| 5,249,284 | 9/1993 | Kass et al. | 395/425 |
| 5,265,232 | 11/1993 | Gannon et al. | 395/425 |
| 5,276,852 | 1/1994 | Callander et al. | 395/425 |

FOREIGN PATENT DOCUMENTS

| | | |
|---|---|---|
| 59143/86 | 6/1989 | Australia . |
| 0095598A3 | 12/1983 | European Pat. Off. . |
| 0165823A3 | 12/1985 | European Pat. Off. . |
| 0463967A2 | 1/1992 | European Pat. Off. . |

OTHER PUBLICATIONS

Archibald et al., "Cache Coherence Protocols: Evaluation Using a Multi-Processor Simulation Model," ACM Transactions on Computer Systems, No. 4, Nov. 1986, New York, N.Y., U.S.A., pp. 273–298.

Tang, "Cache System Design in the Tightly Coupled Multiprocessor System," American Federation of Information Processing Soc., Joint Computer Conf., vol. 45: Proceedings of the National Computer Conference, New York, Jun. 7–10, 1976, U.S.A., pp. 749–753.

Primary Examiner—Glenn Gossage
Attorney, Agent, or Firm—Denis G. Maloney; Arthur W. Fisher

[57] ABSTRACT

A processor and method for delaying the processing of cache coherency transactions during outstanding cache fills in a multi-processor system using a shared memory. A first processor fetches data having a specified address by addressing a cache memory, and when the specified address is not in the cache, saving the specified address in a fill address memory, and sending a fill request to the shared memory. Before return of fill data, the first processor receives a cache coherency request including the specified address from a second processor requesting invalidation of an addressed block of data. The first processor responds by checking whether the fill address memory includes the specified address, and upon finding the specified address in the fill address memory, delaying execution of the cache coherency request until the fill data is returned, and when the fill data is returned, using the fill data without retaining a validated block of the fill data in the cache. In a preferred embodiment, the fill memory is a content-addressable memory including a plurality of entries, and each entry has a fill address, an ownership fill bit (OREAD), an ownership-read invalidate pending bit (OIP), and a read invalidate pending bit (RIP). The OIP or RIP bit is set when execution of a cache coherency request is delayed, and these bits are read upon completion of a fill to execute the delayed request.

19 Claims, 15 Drawing Sheets

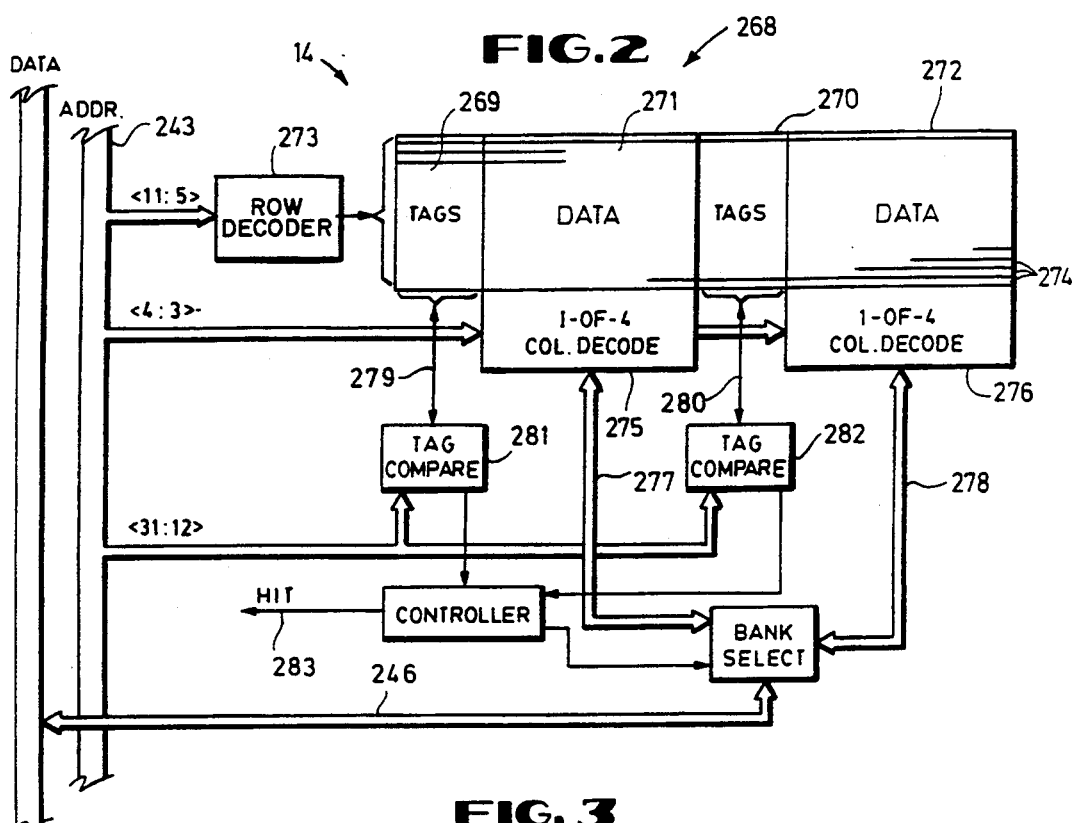
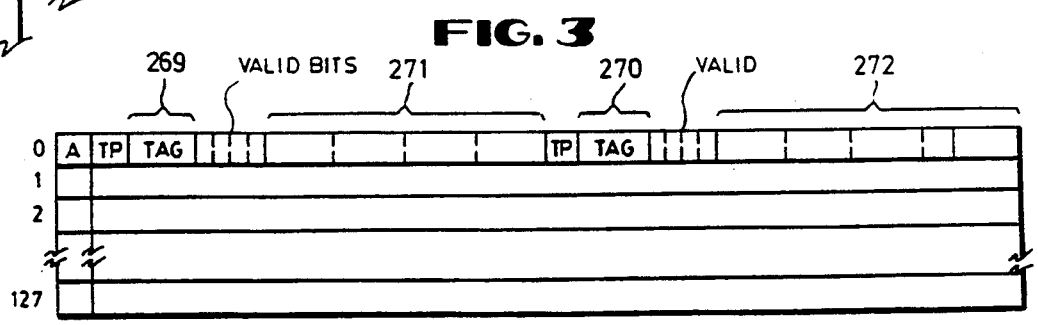

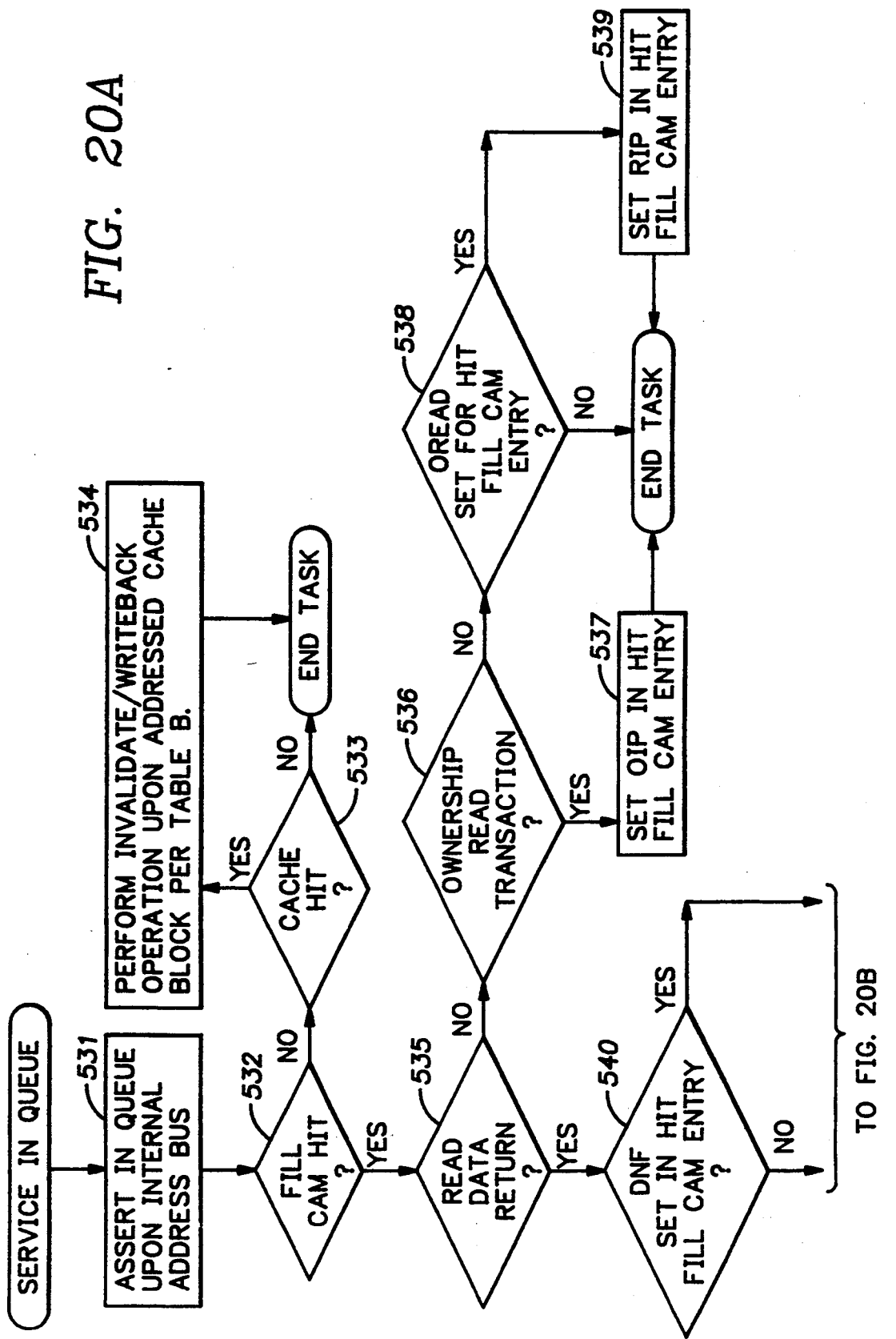

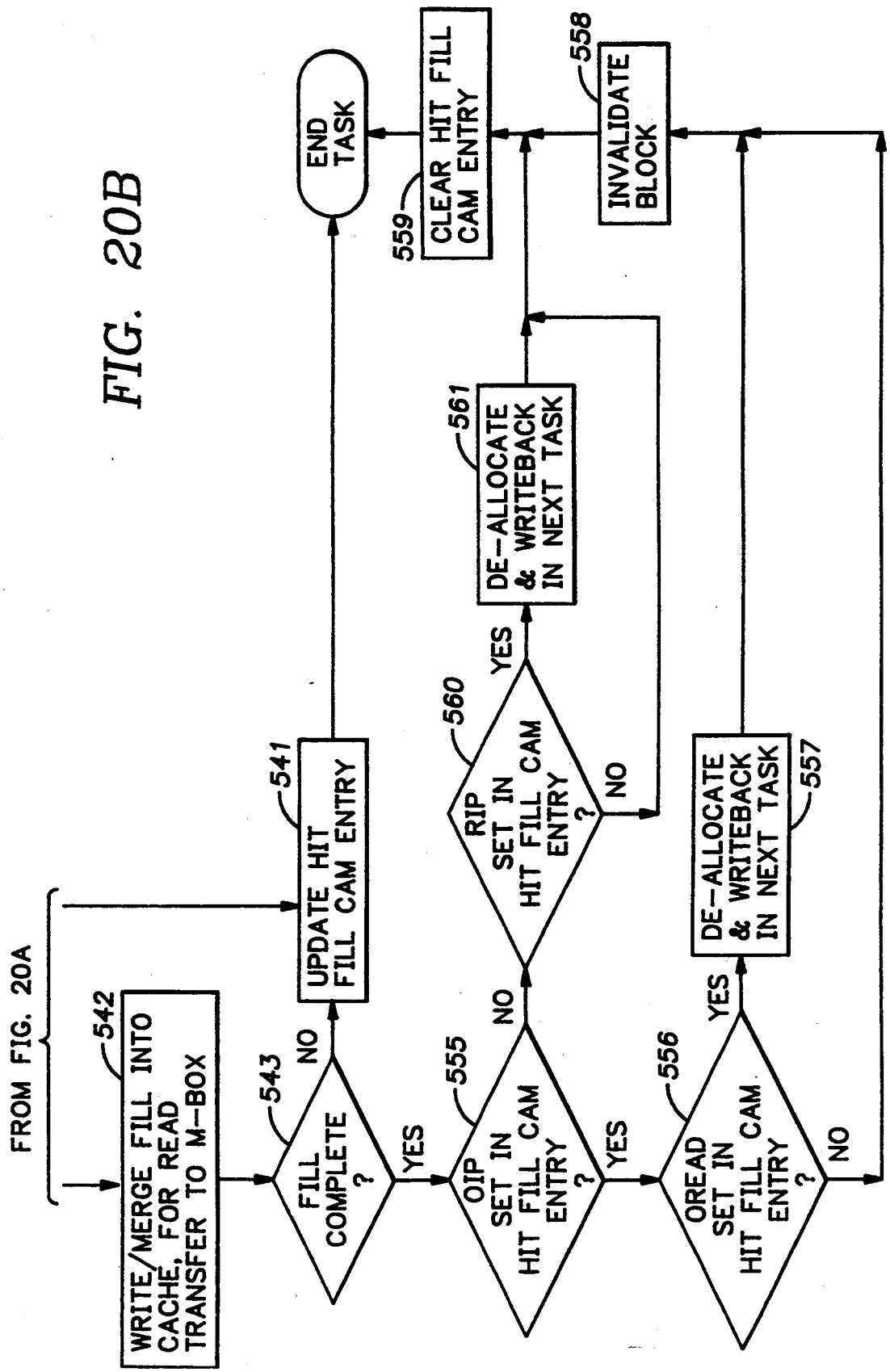

PROCESSOR AND METHOD FOR DELAYING THE PROCESSING OF CACHE COHERENCY TRANSACTIONS DURING OUTSTANDING CACHE FILLS

RELATED CASES

The present application is a continuation-in-part of Ser. No. 07/547,699, filed Jun. 29, 1990, entitled BUS PROTOCOL FOR HIGH-PERFORMANCE PROCESSOR, by Rebecca L. Stamm et al., now abandoned in favor of continuation application Ser. No. 08/034,581, filed Mar. 22, 1993, entitled PROCESSOR SYSTEM WITH WRITEBACK CACHE USING WRITEBACK AND NON WRITEBACK TRANSACTIONS STORED IN SEPARATE QUEUES, by Rebecca L. Stamm, et al., issued on May 31, 1994, as U.S. Pat. No. 5,317,720, and Ser. No. 07/547,597, filed Jun. 29, 1990, entitled ERROR TRANSITION MODE FOR MULTI-PROCESSOR SYSTEM, by Rebecca L. Stamm et al., issued on Oct. 13, 1992, as U.S. Pat. No. 5,155,843, incorporated herein by reference. The present application is related to Stamm et al., "Preventing Access to Locked Memory Block By Recording Lock in Content Addressable Memory with Outstanding Cache Fills," Ser. No. 07/902,122, filed Jun. 22, 1992, concurrently with the present application.

The present application is related to Stamm et al., "Preventing Access to Locked Memory Block By Recording Lock in Content Addressable Memory with Outstanding Cache Fills," Ser. No. 07/902,122, filed Jun. 22, 1992, concurrently with the present application.

BACKGROUND OF THE INVENTION

1. Field of the Invention

This invention is directed to digital computers, and more particularly to cache coherency transactions in a multi-processor system following a cache ownership protocol. Specifically, the invention relates to maintaining cache coherency in such a system having a "pended" bus permitting cache coherency transactions to be transmitted among processors during outstanding fills.

2. Description of the Background Art

Processors in a multi-processor computer system typically communicate via a shared memory. To improve system performance, each processor has a cache memory for temporarily storing copies of data being accessed. Such a hierarchical memory system may follow either a "write through" or a "write back" protocol. In a "write through" protocol, a processor immediately writes data to the shared memory so that any other processor may fetch the most recent memory state from the shared memory. In a "writeback" protocol, a processor writes data to its cache, but this new memory state is written back to the shared memory only when the memory space in the cache needs to be used for different addresses in a cache fill operation, or when another processor needs the new memory state. Therefore the writeback protocol reduces the number of memory access operations to the shared memory when the new memory state is not needed by the other processors. In general, the write through protocol is preferred when the different processors frequently access the same shared memory addresses, and the write back protocol is preferred when the different processors infrequently access the same shared memory addresses.

Whenever processors communicate via a shared memory, it is desirable to require the processors to follow a protocol ensuring that a memory address is not written to simultaneously by more than one processor, or else the result of one processor will be nullified by the result of another processor. Such synchronization of memory access is commonly achieved by requiring a processor to obtain an exclusive privilege to write to an addressed portion of the shared memory, before executing a write operation. In a multi-processor system employing writeback caches, such an exclusive privilege gives rise to a cache coherency problem in which data written in the cache of a processor having such an exclusive privilege might be the only valid copy of data for the addressed portion of memory. A cache coherency protocol is required which permits a processor to obtain readily the valid copy of data as well as the privilege to write to it.

One known cache coherency protocol for a multi-processor system employing writeback caches is based on the concept of block ownership; an addressed portion of memory the size of a cache block is either owned by the shared memory or it is owned by one of the writeback caches. Only one of the processors, or the shared memory, may own the block of memory at any given time, and this ownership is indicated by an ownership bit for each block in the shared memory and in each of the caches. A processor may write to a block only when the processor owns the block. Therefore the ownership bits always identify a unique "valid" block in the system. Shared read-only access to a block is permitted only when the shared memory owns the block. To indicate whether a processor may read a block, each of the caches includes, for each block, a "valid" bit. When a processor desires to read a block that is not valid in its cache, it issues a read transaction to the shared memory, requesting the shared memory to fill its cache with valid data. When a processor desires to write to a block which it does not own, it issues an ownership-read transaction to the shared memory, requesting ownership as well as a fill. From the perspective of the other processors, these transactions are cache coherency transactions, which request any other processor having ownership to give up ownership and writeback the data of the requested block, and in the case of an ownership read transaction, further request the other processors to invalidate any copies of the requested block.

Typically the time for a cache coherency transaction to be transmitted over a system bus is much shorter than the time for fill data to be retrieved from the shared memory. Therefore system performance can be improved by use of a pended bus (i.e., a bus which permits more than one transaction to be pending on the bus at any given time). The use of such a "pended" bus, however, leads to a problem of data coherency where a processor may issue a read transaction to fill a cache block, but before receiving the fill data, the processor may receive a cache coherency transaction requesting the cache block to be disowned or invalidated. A conventional way of handling this problem is for the processor to immediately invalidate the cache block by clearing the "valid" bit, which effectively discards the fill data when it is received. But in this case the processor which first requested the data does not get to use it, and must reissue a read transaction to get the data.

SUMMARY OF THE INVENTION

In accordance with a basic aspect of the invention, there is provided a method of operating a first processor in a multi-processor system that has a second processor and a shared memory accessed by both of the first and second processors. The first processor has a cache memory for storing blocks of data and associated addresses. The first processor fetches data having a specified address by addressing the cache memory with the specified address, and when the specified address is not found in the cache memory, saving the specified address in a fill address memory, and sending a fill data request including the specified address to the shared memory. Before receipt of the requested fill data from the shared memory, the first processor receives a cache coherency request including the specified address from the second processor requesting invalidation of a block of data having the specified address. The first processor responds to the cache coherency request by checking whether the fill memory includes the specified address, and upon finding that the fill memory includes the specified address, delaying execution of the cache coherency request until the fill data is received by the first processor, and when the fill data is received by the first processor, using the fill data without retaining a validated block of the fill data in the cache.

In a preferred embodiment, the fill memory is a content-addressable memory (CAM) including a plurality of entries, and each of the entries has a fill address, and associated with the fill address, an ownership fill bit (OREAD), an ownership-read invalidate pending bit (OIP), and a read invalidate pending bit (RIP). The ownership fill bit (OREAD) is set when the first processor requests a fill with ownership of a block of fill data having the associated fill address. The ownership-read invalidate pending (OIP) bit is set when the first processor receives from the second processor a request for ownership of the block of data having the associated fill address. The read invalidate pending (RIP) bit is set when the first processor receives from the second processor a request to read the block of data having the associated fill address, and the ownership fill bit (OREAD) associated with the fill address has been set. Upon receipt of a block of fill data from the shared memory, the first processor loads the block of fill data into the cache memory and subsequently uses the fill data for a data processing operation. Immediately after loading the block of fill data into the cache memory, however, the block of fill data is invalidated when the associated OIP bit has been set, and the block of fill data is disowned and written back to the shared memory when the associated OREAD bit has been set and the associated OIP or RIP bit has been set. Finally, the first processor clears the entry in the fill memory having the address of the block of fill data.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 2 is a block diagram of a primary cache memory of the CPU of FIG. 1;

FIG. 3 is a diagram of the format of data stored in the primary cache of FIG. 2;

FIGS. 20A and 20B together comprise a flowchart showing control sequences followed by the arbiter of FIG. 17 when responding to cache coherency transactions.

DESCRIPTION OF THE PREFERRED EMBODIMENT

The Multi-Processor System

Figure 1:
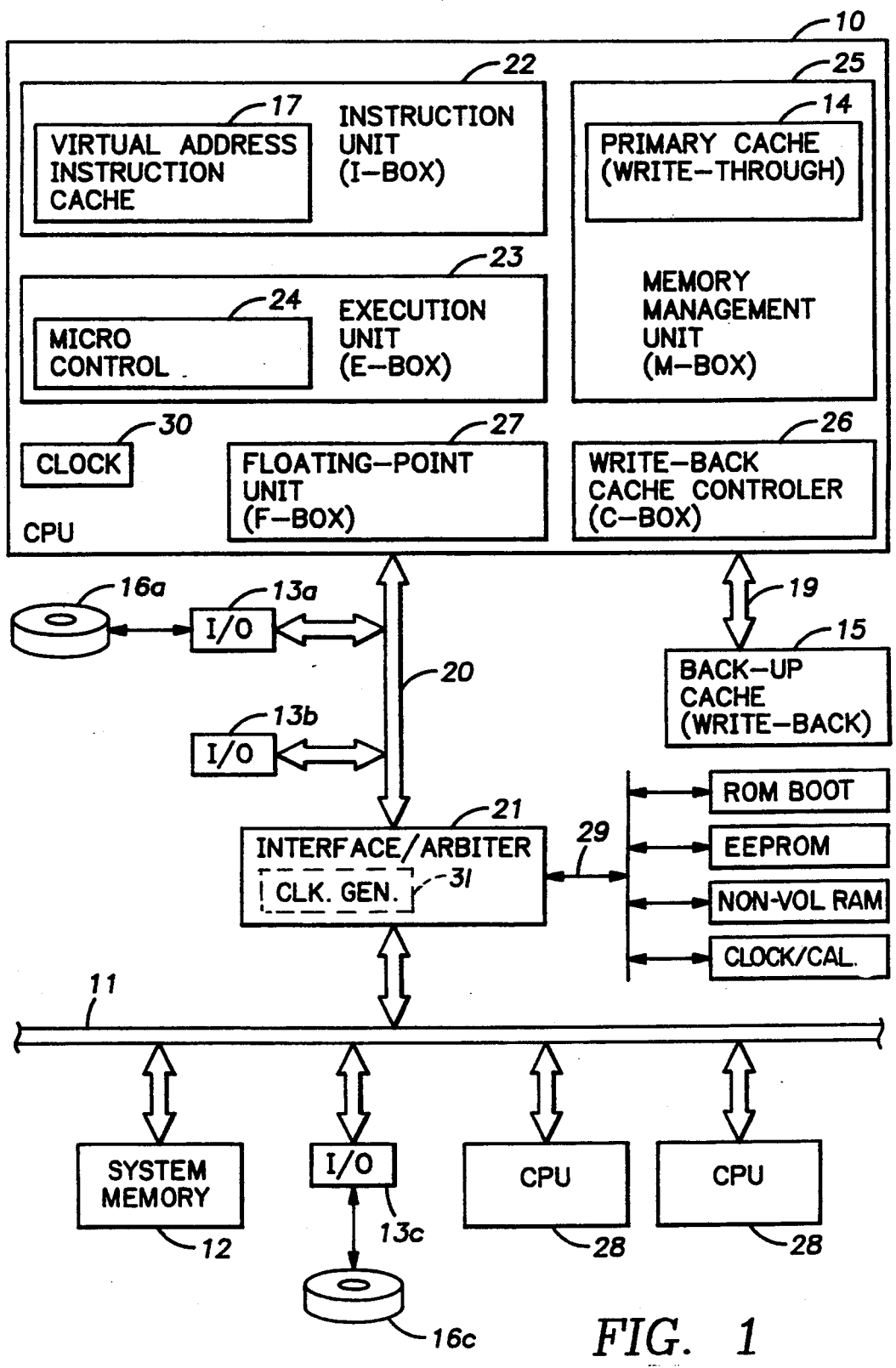
FIG. 1 is a block diagram of a multi-processor computer system incorporating the present invention.

Referring to FIG. 1, according to one embodiment, a multi-processor computer system employing features of the invention includes a central processing unit (CPU) chip or module 10 connected by a system bus 11 to a system memory 12, an input/output (I/O) unit 13c, and to additional CPU's 28. As will be further described below with reference to FIG. 6, two I/O units 13a, 13b may also be connected directly to a bus 20. In a preferred embodiment the CPU 10 is formed on a single integrated circuit, although the present invention may be used with a CPU implemented as a chip set mounted on a single circuit board or multiple boards.

When fetching instructions or data, the CPU 10 accesses an internal or primary cache 14, then a larger external or backup cache 15. Thus, a hierarchical memory is employed, the fastest being the primary cache 14, then the backup cache 15, then the main system memory 12, usually followed by disk memories 16a, 16c accessed through the I/O elements 13a, 13c by employing an operating system (i.e., software). A virtual memory organization is employed, with page swapping between disks 16a, 16c and the memory 12 used to keep the most-likely-to-be-used pages in the physical memory 12. An additional cache 17 in the CPU 10 stores instructions only, using the virtual addresses instead of physical addresses. Physical addresses are used for accessing the primary and backup caches 14 and 15, and are used on the bus 11 and in the memory 12.

When the CPU 10 fetches an instruction, first the virtual instruction cache 17 is checked, and if a cache miss occurs the address is translated to a physical address and the primary cache 14 is checked. If the instruction is not in the primary cache, the backup cache 15 is accessed, and upon a cache miss in the backup cache the system memory 12 is accessed. The primary cache 14 is smaller but faster than the backup cache 15, and the content of the primary cache 14 is a subset of the content of the backup cache 15. The virtual instruction cache 17 differs from the operation of the other two caches 14 and 15 in that there are no writes to the cache 17 from the CPU 10 except when instructions are fetched, and also the content of this cache 17 need not be a subset of the content of the caches 14 or 15, although it may be.

The CPU 10 accesses the backup cache 15 through a bus 19, separate from a CPU bus 20 used to access the system bus 11; thus, a cache controller 26 for the backup cache 15 is included within the CPU chip. Both the CPU bus 20 and the system bus 11 are 64-bit bidirectional multiplexed address/data buses, accompanied by control buses containing request, grant, command lines, etc. The bus 19, however, has a 64-bit data bus and separate address buses. The system bus 11 is interconnected with the CPU bus 20 by an interface/arbiter unit 21 (hereinafter referred to as interface 21) functioning to arbitrate access by the CPU 10 and the other components on the CPU bus 20.

Transfers of data to and from the caches 14 and 15 and the memory 12 are usually 64-bits at a time, and the buses 11 and 20 are 64-bits wide, referred to as a quadword (four 16-bit words or eight 8-bit bytes).

Each additional CPU 28 can include its own CPU chip 10, cache 15 and interface unit 21, if these CPUs 28 are of the same design as the CPU 10. Alternatively, these other CPUs 28 may be of different construction but executing a compatible bus protocol to access the main system bus 11. These other CPUs 28 can access the memory 12, and so the blocks of data in the caches 14 or 15 can become obsolete. If a CPU 28 writes to a location in the memory 12 that happens to be duplicated in the cache 15 (or in the primary cache 14), then the data at this location in the cache 15 is no longer valid. For this reason, blocks of data in the caches 14 and 15 are "invalidated" as will be described, when there is a write to memory 12 from a source other than the CPU 10 (such as the other CPUs 28). The cache 14 operates on a "write-through" principle, whereas the cache 15 operates on a "write-back" principle. When the CPU 10 executes a write to a location which happens to be in the primary cache 14, the data is written to this cache 14 and also to the backup cache 15 (and sometimes also to the memory 12, depending upon conditions); this type of operation is "write-through". When the CPU 10 executes a write to a location which is in the backup cache 15, however, the write is not necessarily forwarded to the memory 12, but instead is written back to memory 12 only if another element in the system (such as a CPU 28) needs the data (i.e., tries to access this location in memory), or if the block in the cache is displaced (deallocated) from the cache 15.

The interface unit 21 has three bus ports. In addition to the CPU address/data port via bus 20 and the main system bus 11, a read-only memory (ROM) bus 29 is provided for accessing a boot ROM as well as electrically erasable read-only memory (EEPROM), non-volatile random-access memory (RAM) (with battery back up) and a clock/calendar chip. The ROM bus 29 is only 8-bits wide, as the time demands on ROM bus accesses are less stringent. This ROM bus can also access a keyboard and/or liquid crystal display (LCD) display controller as well as other input devices such as a mouse. A serial input/output port to a console is also included in the interface 21, but will not be treated here.

In one example, the system of FIG. 1 may have a backup cache 15 of 256 Kbytes, a main system memory 12 of 128 Mbytes, and a disk 16c capacity of perhaps 1 Gbyte or more. In this example, the access time of the backup cache 15 may be about 25 nsec (two CPU machine cycles), while the access time of the main memory 20 from the CPU 10 via bus 11 may be ten or twenty times that of the backup cache; the disk 16c, of course, has an access time of more than ten times that of the main memory. In a typical system, therefore, the system performance depends upon executing as much as possible from the caches.

In an exemplary embodiment, the machine cycle is nominally 14 nanoseconds (nsec); i.e., the clock frequency is about 71 Mhz. The bus 20, however, operates on a bus cycle which is three times longer than the machine cycle of the CPU, so in this example the bus cycle is nominally 42 nsec. The system bus 11, however, operates on a longer bus cycle about twice as long as that of the bus 20, e.g., about 64 nsec, and this bus cycle is asynchronous to the CPU 10 and bus 20. The timing cycle of the system bus 11 is controlled by a clock generator 31 in the interface unit 21.

The memory management unit 25 receives read requests from the instruction unit 22 (both instruction stream and data stream) and from the execution unit 23 (data stream only). The memory management unit 25 delivers memory read data to either the instruction unit 22 (64-bits wide) or the execution unit 23 (32-bits wide). The memory management unit 25 also receives write/store requests from the execution unit 23, as well as invalidates, primary cache 14 fills and return data from the cache controller unit 26. The memory management unit 25 arbitrates between these requesters, and queues requests which cannot currently be handled. Once a request is started, the memory management unit 25 performs address translation, mapping virtual to physical addresses, using a translation buffer. This address translation takes one machine cycle, unless there is a miss in the translation buffer. In the case of a miss, the memory management unit 25 causes a page table entry to be read from page tables in memory and a translation buffer fill is performed to insert the address which missed. The memory management unit also performs all access checks to implement page protection.

The primary cache 14 referenced by the memory management unit 25 is a two-way set associative write-through cache with a block and fill size of 32-bytes. The primary cache state is maintained as a subset of the backup cache 15.

The cache controller unit 26 is the controller for the backup cache 15, and interfaces to the external CPU bus 20. The cache controller unit 26 receives read requests and writes from the memory management unit 25, and sends primary cache 14 fills and invalidates to the memory management unit 25. The cache controller unit 26 ensures that the primary cache 14 is maintained as a subset of the backup cache 15 by the invalidates. The cache controller unit 26 receives cache coherency transactions from the bus 20, to which it responds with invalidates and writebacks, as appropriate.

In response to a memory read request (other than a READ LOCK, as described below), the memory management unit 25 accesses the primary cache 14 for the read data. If the primary cache 14 determines that requested read data is not present, a "cache miss" or "read miss" condition occurs. In this event, the memory management unit 25 instructs the cache controller unit 26 to continue processing the read. The cache controller unit 26 first looks for the data in the backup cache 15 and fills the block in the primary cache 14 from the backup cache 15 if the data is present. If the data is not present in the backup cache 15, the cache controller unit 26 requests a cache fill on the CPU bus 20 from memory 12. When memory 12 returns the data, it is written to both the Backup cache 15 and to the primary cache 14. The cache controller unit 26 sends four quadwords of data to the memory management unit 25 using instruction-stream cache fill or data-stream cache fill commands. The four cache fill commands together are used to fill the entire primary cache 14 block corresponding to the hexaword (16-word) read address on bus 57. In the case of data-stream fills, one of the four cache fill commands will be qualified with a signal indicating that this quadword fill contains the requested data-stream data corresponding to the quadword address of the read. When this fill is encountered, it will be used to supply the requested read data to the memory management unit 25, instruction unit 22 and/or execution unit 23. If, however, the physical address corresponding to the cache fill command falls into I/O space, only one quadword fill is returned and the data is not cached in the primary cache 14. Only memory data is cached in the primary cache 14.

All writes are initiated by the memory management unit 25 on behalf of the execution unit 23. The primary cache 14 is a write-through cache; therefore, writes are only written into the primary cache 14 if the write address matches a validated primary cache 14 tag entry. The one exception to this rule is when the primary cache 14 is configured in force data-stream hit mode; in this mode, the data is always written to the primary cache 14 regardless of whether the tag matches or mismatches. All write references which pass memory management checks are transferred to the cache controller unit 26; the cache controller 26 processes writes in the back-up cache 15 and controls the protocols related to the write-back memory subsystem.

The present invention more particularly concerns the operation of the cache-controller 26 and maintenance of coherency of the back-up cache 15 with the memory 12 and caches of the other CPU's 28 in the multi-processor system in FIG. 1. Therefore, the specific construction of the components in the CPU 10 other than the cache controller 26 are not pertinent to the present invention. The reader, however, may find additional details in the above-referenced U.S. application Ser. No. 07/547,597, filed Jun. 29, 1990, and issued on Oct. 13, 1992, as U.S. Pat. No. 5,155,843, incorporated herein by reference.

Cache Coherency

Cache coherency in the multi-processor system of FIG. 1 is based upon the concept of ownership; a hexaword (16-word) block of memory may be owned either by the system memory 12 or by a backup cache 15 in a CPU on the bus 11—in a multi-processor system. Only one of the caches, or system memory 12, may own the hexaword block at a given time, and this ownership is indicated by an ownership bit for each hexaword in both memory 12 and the backup cache 15 (1 for own, 0 for not-own).

Shared read-only access to a block among the CPUs 10, 28 is permitted only when system memory 12 owns the block. A CPU may write to a block only when the CPU owns the block. These rules ensure that there is always a unique "valid" block of data in the system, identified by the ownership bits in the caches, and a CPU will always read data from the valid block and write data to the valid block.

The multi-processor system follows certain protocols which ensure rapid access to the valid data of an addressed block. Each back-up cache 15 maintains two bits associated with each cache block. These two bits are called VALID and OWNED, and they determine the state of the cache block as shown in TABLE A.

If the VALID bit of a cache block is not set, then the cache block is invalid. If an invalid cache block is accessed by its CPU, then the cache block is refilled with data from the current owner of the cache block. If the access is for a data read operation and the current owner is the system memory 12, then the refill data is obtained from the system memory 12, and the system memory 12 will retain ownership of the cache block. If the access is for a data read operation and the current owner is another cache, then the valid data is written from that other cache back to the system memory 12, the valid data is also refilled in the cache block of the cache of the accessing CPU, and the system memory 12 obtains and retains ownership of the cache block. If the access is for a write operation and the current owner is the system memory 12, then the valid data is obtained from the system memory 12, and the accessing cache obtains ownership of the cache block. If the access is for a write operation and the current owner is another cache, then the valid data is written from that other cache back to the system memory 12, the cache block of that other cache is invalidated, the valid data is also refilled in the cache block of the cache of the accessing CPU, and the cache of the accessing CPU obtains ownership of the cache block.

If the VALID bit of the cache block of the accessing CPU is set but the corresponding OWNED bit is not set, then the system memory 12 is the owner of the cache block. The accessing CPU can read valid data from this valid un-owned cache block. The accessing CPU, however, can write data to this valid un-owned cache block only after obtaining ownership of the cache block from the system memory 12 and invalidating any copies in other caches.

If both the VALID and OWNED bits of the cache block of the accessing CPU are set, then the accessing CPU is the owner of the cache block, and the accessing CPU is free to read or write to the cache block.

A cache can also "disown" ownership of a cache block, for example, when a cache block currently owned by the cache is written back to memory to free-up space in the cache for another cache block.

The CPU 10 initiates the above operations upon memory 12 or the cache of another CPU 28 by transmitting cache coherency commands over the CPU bus 20 and the system bus 10. The cache coherency commands are listed in Table B, together with actions performed when another CPU receives each command.

The instruction read command IREAD requests instructions from an addressed cache block. The DREAD command requests data from an addressed cache block. When intercepted by another CPU, these commands cause no change in the state of the cache of another CPU unless the accessed cache block is owned by another CPU. In this case, the other CPU relinquishes ownership by writing the data in the cache block of its cache back to system memory 12 and setting the cache block of its own cache to a state of "valid-unowned." This kind of writeback-invalidate operation is known as a "Rinval" operation.

The command OREAD requests ownership as well as data from the addressed cache block. The command WRITE transmits data to the system memory 12. If another CPU intercepts either of these commands and has the addressed cache block in its cache, then it invalidates the addressed block in its cache. Moreover, if the other CPU owned the addressed cache block, it gives up ownership and writes back data from the addressed cache block in its cache to the system memory 12. This kind of writeback-invalidate operation is known as an "Oinval" operation.

To avoid stalls and possible deadlocks, the above cache coherency protocols are implemented in such a manner as to pass cache block ownership from one CPU to another as quickly as possible. In this regard, cache block ownership is different from a memory lock that typically requires execution of respective program instructions for setting and clearing the lock. The hardware of the preferred embodiment of FIG. 1, for example, does not have such memory locking facilities, which could be implemented by storing additional "lock bits" in association with the cache blocks in each of the caches and the system memory 12.

The preferred embodiment of FIG. 1, however, does have one instance where one CPU will not immediately relinquish ownership to another CPU. The preferred embodiment executes (VAX) instructions, including certain "interlocked" instructions that are guaranteed to perform atomic operations upon memory in a multi-processing environment. An example is an "add aligned word interlocked" instruction (ADAWI) which adds a first operand to a second operand and sets the second operand to the sum. The destination operand has an access type of "modify" raising the possibility that one CPU might obtain ownership of a cache block between the time that the second operand is read from memory and the time that the second operand is modified and written back to memory, leading to a result in memory which might not appear consistent under certain program sequences. Computers which execute (VAX) instructions in a multi-processing environment typically prevent such an interruption of memory access by using the execution unit to request fetching of the second operand and to request a memory "read lock" when fetching the second operand from memory, and to request a memory "write unlock" when putting the result back to memory.

In the CPU 10 in FIG. 1, the execution unit 23 transmits to the memory management unit 25 a memory fetch and read lock request for fetching from memory an operand to be modified by an interlocked (VAX) instruction. In response to the read lock request, the memory management unit places a memory lock on the memory location to be modified. This memory lock remains until the execution unit sends the result to the locked memory location together with a memory unlock request. Since the execution unit generates paired of read lock/write unlock requests during execution of a single interlocked instruction, only one cache block is locked by this mechanism at any given time. Moreover, when the execution unit generates a read lock request, it will be followed, without interruption, by a corresponding write unlock request.

Upon receipt of a read lock request, the memory management unit 25 always forces a primary cache 14 read miss sequence regardless of whether the referenced data is actually stored in the primary cache. This is necessary in order that the read propagate out to the cache controller unit 26 so that memory lock/unlock protocols can be properly processed. Therefore, the memory management unit 25 transmits a READ LOCK command to the cache controller 26.

Upon receipt of a READ LOCK command, the cache controller obtains ownership of the cache block to be locked, if the cache block is not already owned, before transmitting the referenced data back to the memory management unit 25. Ownership of this interlocked cache block is retained at least until cache controller 26 writes the modified value back into the interlocked cache block upon receipt of a corresponding WRITE UNLOCK command from the memory management unit. Write-back of the block to the system memory 12 is prevented from the time that the cache controller receives the READ LOCK command to the time that the cache controller executes the WRITE UNLOCK command. Moreover, in the preferred system of FIG. 1, once a READ LOCK command has been passed to the cache controller, the cache controller will not process any subsequent data stream read references until the corresponding WRITE UNLOCK command has been executed.

In addition to the READ LOCK and WRITE UNLOCK commands, the memory management unit 25 passes the following commands to the cache controller 26: DREAD (Data Stream Read), READ MODIFY (Data Stream Read with Intent to Write), IPR READ (Internal Processor Read), IREAD (Instruction-stream Read), IPR WRITE (Internal Processor Register Write), and WRITE (Data Write to Memory or I/O Space). In general, the cache controller responds to the DREAD, IREAD, READ MODIFY, and WRITE commands in accordance with the cache coherency protocols described above. The IPR READ and IPR WRITE commands may reference internal registers of the cache controller, and which would not involve access to the cache 15 or the CPU bus 20.

The cache controller responds to an IREAD, DREAD, and READ MODIFY command in a similar fashion by accessing the back-up cache 15, and detecting a "cache hit" if the cache tag matches the requested cache block address and the valid bit of the indexed cache block is set. The back-up cache is accessed in a similar fashion for the READ LOCK command, but a cache bit also requires the ownership bit of the indexed cache block to be set. IREAD and DREAD misses result in IREAD and DREAD commands on the CPU bus 20 and the system bus 11. READ MODIFY, READ_LOCK, and WRITE misses result in OREAD commands the CPU bus 20 and the system bus 11.

The Primary Cache

Turning now to FIG. 2, the primary cache 14 is a two-way set-associative, read allocate, no-write allocate, write-through, physical address cache of instruction stream and data stream data. The primary cache 14 has a one-cycle access and a one-cycle repetition rate for both reads and writes. The primary cache 14 includes an 8Kbyte data memory array 268 which stores 256-hexaword blocks, and stores 256 tags in tag stores 269 and 270. The data memory array 268 is configured as two blocks 271 and 272 of 128 rows. Each block is 256-bits wide so it contains one hexaword of data (four quadwords or 32-bytes); there are four quadword subblocks per block with a valid bit associated with each subblock. A tag is twenty bits wide, corresponding to bits <31:12> of the physical address on bus 243.

Turning now to FIG. 3, the organization of data in the primary cache 14 is shown in more detail. Each index (an index being a row of the memory array 268) contains an allocation pointer A, and contains two blocks where each block consists of a 20-bit tag, 1-bit tag parity TP, four valid bits VB (one for each quadword), 256-bits of data, and 32-bits of data parity.

Returning now to FIG. 2, a row decoder 273 receives bits <5:11> of the primary cache 14 input address from the bus 243 and selects 1-of-128 indexes (rows) 274 to output on column lines of the memory array, and column decoders 275 and 276 select 1-of-4 colums based on bits <3:4> of the address. So, in each cycle, the primary cache 14 selects two quadword locations from the hexaword outputs from the array, and the selected quadwords are available on input/output lines 277 and 278. The two 20-bit tags from tag stores 269 and 270 are simultaneously output on lines 279 and 280 for the selected index and are compared to bits <31:12> of the address on bus 243 by tag compare circuits 281 and 282. The valid bits are also read out and checked; if zero for the addressed block, a miss is signaled. If either tag generates a match, and the valid bit is set, a hit is signalled on line 283, and the selected quadword is output on bus 246. A primary cache 14 miss results in a quadword fill; a memory read is generated, resulting in a quadword being written to the block 271 or 272 via bus 246 and bus 277 or 278. At the same time data is being written to the data memory array, the address is being written to the tag store 269 or 270 via lines 279 or 280. When an invalidate is sent by the cache controller unit 26, upon the occurrence of a write to backup cache 15 or system memory 12, valid bits are reset for the index.

The primary cache 14 must always be a coherent cache with respect to the backup cache 15. The primary cache 14 must always contain a strict subset of the data cached in the backup cache 15. If cache coherency were not maintained, incorrect computational sequences could result from reading "stale" data out of the primary cache 14 in multi-processor system configurations.

An invalidate is the mechanism by which the primary cache 14 is kept coherent with the backup cache 15, and occurs when data is displaced from the backup cache 15 or when backup cache 15 data is itself invalidated. The cache controller unit 26 initiates an invalidate by specifying a hexaword physical address qualified by the Inval command on a bus (59 in FIG. 4). Execution of an Inval command guarantees that the data corresponding to the specified hexaword address will not be valid in the primary cache 14. If the hexaword address of the Inval command does not match to either of the two primary cache 14 tags in the addressed index, no operation takes place. If the hexaword address matches one of the tags, the four corresponding subblock valid bits are cleared to guarantee that any subsequent primary cache 14 accesses of this hexaword will miss until this hexaword is re-validated by a subsequent primary cache 14 fill sequence. A primary cache 14 invalidate operation is interpreted as a NOP (no operation) by the primary cache 14 if the address does not match either tag field in the addressed index.

A primary cache 14 fill operation is initiated by an instruction stream or data stream cache fill reference. A fill is a specialized form of a write operation, in which fill address bits <31:12> are written into the tag field of the selected bank. If a cache fill sequence to the same hexaword address is in progress when the Inval is executed, then any further cache fills are inhibited from loading data or validating data for this cache block.

The Back-Up Cache

Both the tags and data for the backup cache 15 are stored in off-chip RAMs, with the size and access time selected as needed for the system requirements. The backup cache 15 may be of a size of from 128K to 2Mbytes, for example. With an access time of 28 nsec, the cache can be referenced in two machine cycles, assuming 14 nsec machine cycle for the CPU 10. The cache controller unit 26 packs sequential writes to the same quadword in order to minimize write accesses to the backup cache. Multiple write commands from the memory management unit 25 are held in an eight-entry write queue (60 in FIG. 4) in order to facilitate this packing, as further described below.

The Write-Back Cache Controller

Figure 4:
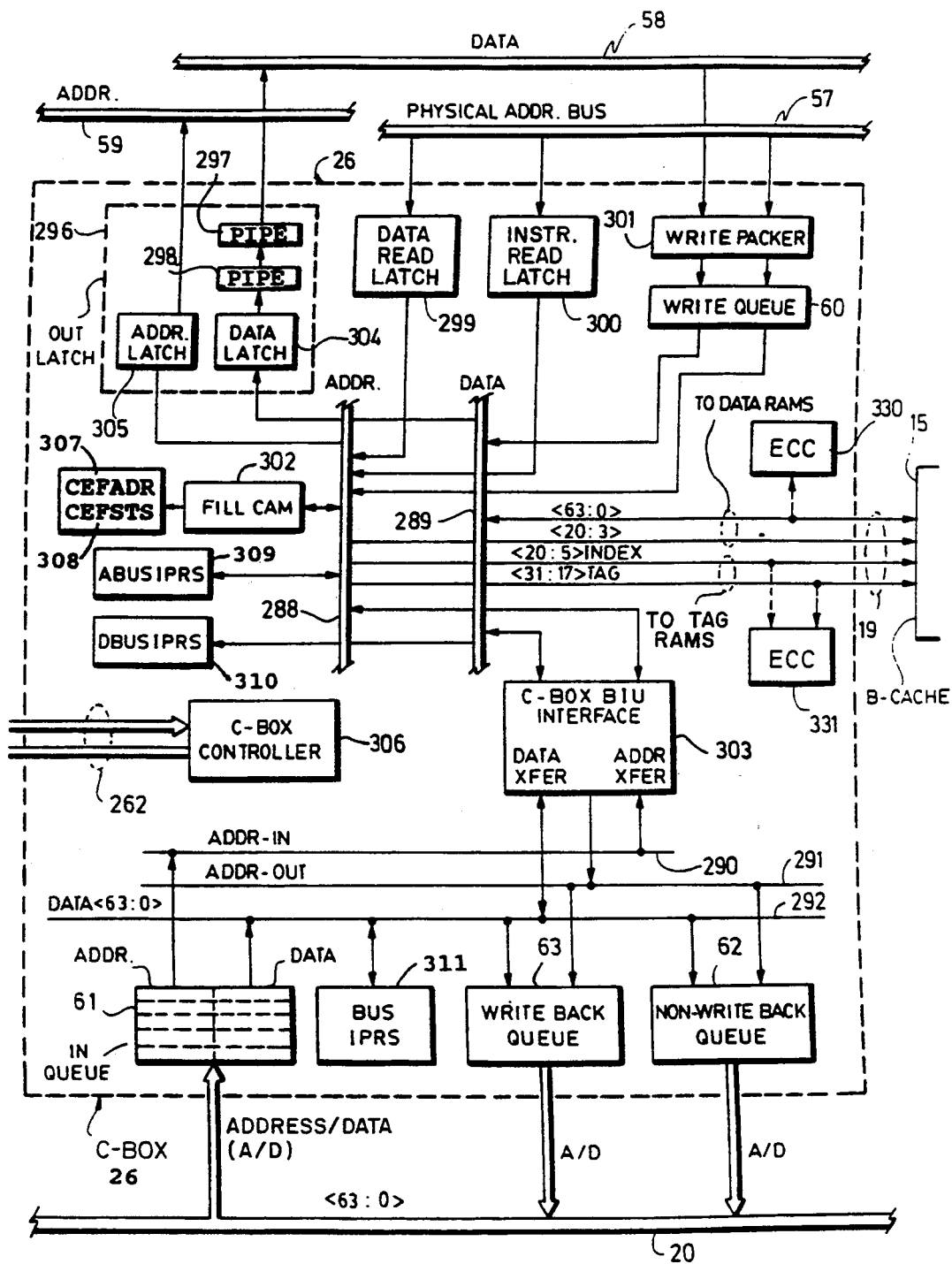
FIG. 4 is a block diagram of a writeback cache controller used in the processors of the computer system of FIG. 1.

Referring now to FIG. 4, the write-back cache controller elements unit 26 includes datapath and control for interfacing to the memory management unit 25, the backup cache 15 and the CPU bus 20. The upper part of FIG. 4 primarily interfaces to the memory management unit 25 and the back-up cache 15. The lower part of FIG. 4 primarily interfaces to the CPU bus 20. The cache controller unit 26 datapath is organized around a number of queues and latches, an internal address bus 288 and internal data bus 289 in the cache control portion, and two internal address buses 290 and 291 and an internal data bus 292 in the bus interface unit. Separate access to the data RAMs and the tag RAMs of the backup cache 15 is provided from the internal address and data buses 288 and 289 by lines 19a and 19b and lines 19c and 19d in the bus 19. The interface to the memory management unit 25 is by physical address bus 57, data bus 58, and the invalidate and fill address bus 59.

The output latch 296 is one entry deep and holds both address and data for fill data or addresses for invalidates being sent to the memory management unit 25 on buses 58 and 59. The two fill-data pipes 297 and 298 are 64-bit latches for pipeline data being sent to the memory management unit 25. The data-read latch 299 is one entry deep and holds the address of a data stream read request coming from the memory management unit 25 on the physical address bus 57. The instruction-read latch 300 is one entry deep and holds the address of an instruction stream read request coming from the memory management unit 25 via physical address bus 57. The write packer 301 is one entry deep and hold both address and data, and functions to compress sequential memory writes to the same quadword. The write queue 60 is eight entries deep and holds both addresses and data for write requests coming from the memory management unit 25 via data bus 58 and physical address bus 57 (via the write packer 301). The fill CAM 302 is two entries deep and holds addresses for read and write misses which have resulted in a read to memory; one may hold the address of an in-progress READ LOCK which has no memory request outstanding.

On the bus 20 side, an input data queue 61 loads fill data and writeback requests from the bus 20 to the CPU 10. The input queue is ten entries deep and holds address or data for up to eight quadword fills and up to two cache coherency transactions from the CPU bus 20. Usually, a non-writeback queue 62 and a writeback queue 63 hold read requests and writeback data, respectively, to be sent to the main memory 12 over the bus 20. The writeback queue 63 is two entries deep (with a data field of 256-bits) and holds writeback addresses and data to be driven on the CPU bus 20; this queue holds up to two hexaword writebacks. The writeback queue 63 is also used for quadword write-disowns. The non-writeback queue 62 is two entries deep for addresses and data, and holds all non-write-disown transactions going to the CPU bus 20; this includes reads, I/O space transactions, and normal writes which are done when the backup cache 15 is off or during an error transition mode. Note that some of these queues contain address and data entries in parallel (the out latch 296, the write packer 301, the write queue 60, and the writeback and non-writeback queues 63 and 62), some contain only data (fill-data pipes 297 and 298), and some contain only addresses (data-read latch 299, instruction-read latch 300 and the fill CAM 302). Since the CPU bus 20 is a multiplexed bus, two cycles on the bus 20 are needed to load the address and data from an entry in the non-write-back queue 62 to the bus 20, for example. Also, the bus 20 is clocked at a cycle time of three times that of the buses 288, 289 and 292.

For a write request, write data enters the cache controller unit 26 from the data bus 58 into the write queue 60 while the write address enters from the physical address bus 57; if there is a cache hit, the data is written into the data RAMs of the backup cache 15 via bus 289 using the address on bus 288, via bus 19. When a writeback of the block occurs, data is read out of the data RAMs via buses 19 and 289, transferred to the writeback queue 63 via interface 303 and buses 291 and 292, then driven out onto the CPU bus 20. A read request enters from the physical address bus 57 and the latches 299 or 300 and is applied via internal address bus 288 to the backup cache 15 via bus 19, and if a hit occurs the resulting data is sent via bus 19 and bus 289 to the data latch 304 in the output latch 296, from which it is sent to the memory management unit 25 via data bus 58. When read data returns from system memory 12, it enters the cache controller unit 26 through the input queue 61 and is driven onto bus 292 and then through the interface 303 onto the internal data bus 289 and into the data RAMs of the backup cache 15, as well as to the memory management unit 25 via output latch 296 and bus 58 as before.

If a read or write incoming to the cache controller unit 26 from the memory management unit 25 does not result in a backup cache 15 hit, the miss address is loaded into the fill CAM 302, which holds addresses of outstanding read and write misses; the address is also driven through the interface 303 to the non-writeback queue 62 via bus 291; it enters the queue 62 to await being driven onto the CPU bus 20 in its turn. Many cycles later, the data returns on the CPU bus 20 (after accessing the system memory 12) and enters the input queue 61. The CPU 10 will have started executing stall cycles after the backup cache 15 miss, in the various pipelines. Accompanying the returning data is a control bit on the control bus in the CPU bus 20 which says which one of the two address entries in the fill CAM 302 is to be driven out onto the bus 288 to be used for writing the data RAMs and tag RAMs of the backup cache 15.

When a cache coherency transaction appears on the CPU bus 20, an address comes in through the input queue 61 and is driven via bus 290 and interface 303 to the bus 288, from which it is applied to the tag RAMs of the backup cache 15 via bus 19. If it hits, the valid bit is cleared, and the address is sent out through the address latch 305 in the output latch 296 to the memory management unit 25 for a primary cache 14 invalidate (where it may or may not hit, depending upon which blocks of backup cache 15 data are in the primary cache 14). If necessary, the valid and/or owned bit is cleared in the backup cache 15 entry. Only address bits <31:5> are used for invalidates, since the invalidate is always to a hexaword.

If a writeback is required due to this cache coherency transaction, the index is driven to the data RAMs of the backup cache 15 so the data can be read out. The address is then driven to the writeback queue 62 for the writeback; it is followed shortly by the writeback data on the data buses.

A five-bit command bus 262 from the memory management unit 25 is applied to a controller 306 to define the internal bus activities of the cache controller unit 26. This command bus indicates whether each memory request is one of eight types: instruction stream read, data stream read, data stream read with modify, interlocked data stream read, normal write, write which releases lock, or read or write of an internal or external processor register. These commands affect the instruction or data read latches 299 and 300, or the write packer 301 and the write queue 60. Similarly, a command bus 262 goes back to the memory management unit 25, indicating that the data being transmitted during the cycle is a data stream cache fill, an instruction stream cache fill, an invalidate of a hexaword block in the primary cache 14, or a NOP. These command fields also accompany the data in the write queue, for example.

The CPU Bus

The CPU bus 20 is a pended, synchronous bus with centralized arbitration. As explained earlier, by "pended" is meant that several transactions can be in process at a given time, rather than always waiting until a memory request has been fulfilled before allowing another memory request to be driven onto the bus 11. The cache controller unit 26 of the CPU 10 may send out a memory read request, and, in the several bus cycles before the system memory 12 sends back the data in response to this request, other memory requests may be driven to the bus 20. The ID (identification) field on the command bus portion of the bus 20 when the data is driven onto the bus 20 specifies which node requested the data, so the requesting node can accept only its own data.

Figure 5:
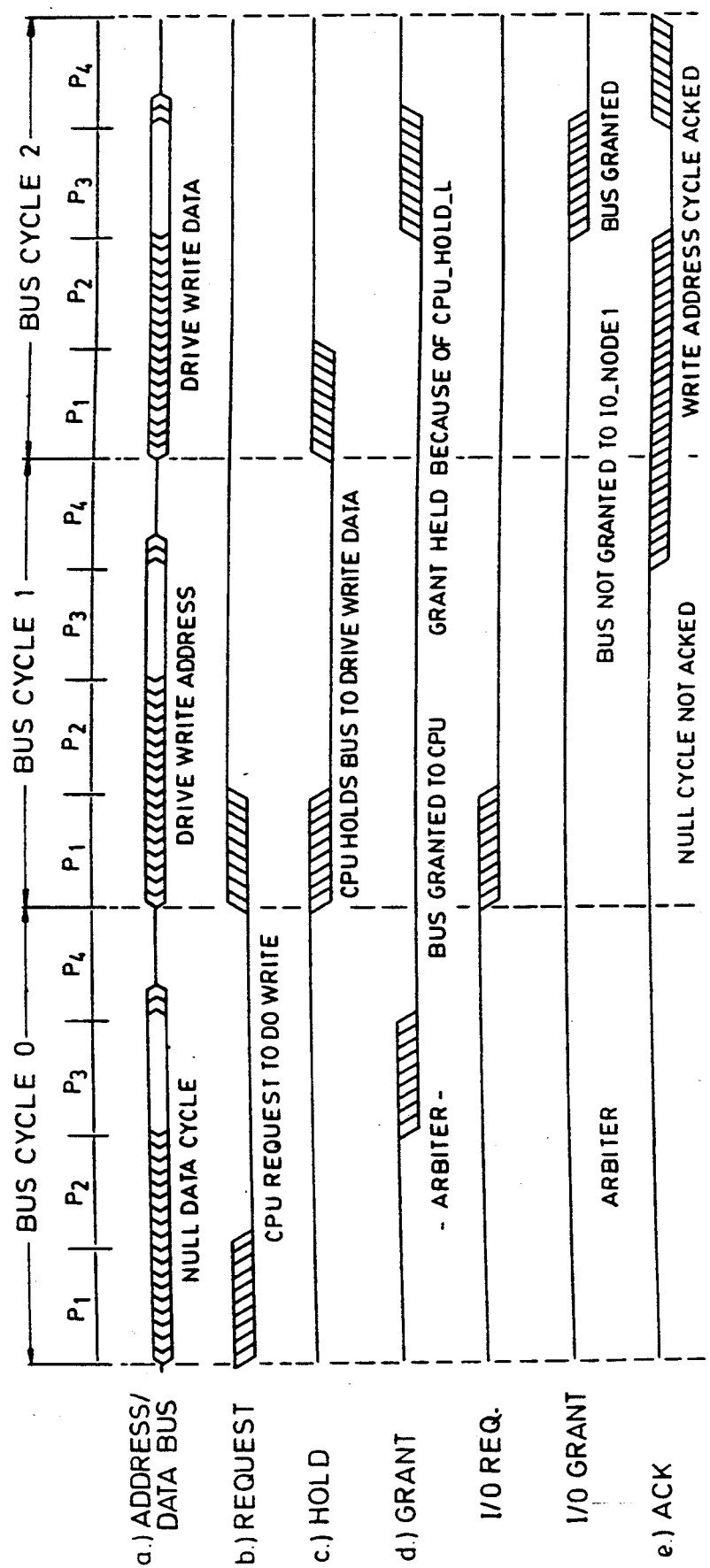
FIG. 5 is a timing diagram of events occurring on the CPU bus in the system of FIG. 1.

In FIG. 5, a timing diagram of the operation of the bus 20 during three cycles is shown. These three cycles are a null cycle-0 followed by a write sequence; the write address is driven out in cycle-1, followed by the write data in cycle-2. Trace (a) shows the data or address on the 64-bit data/address bus. Traces (b) to (e) show the arbitration sequence. In cycle-0 the CPU 10 asserts a request to do a write by a request line being driven low from P2 to P4 of this cycle, seen in trace (b). As shown in trace (d), the arbiter in the bus interface 21 asserts a CPU-grant signal beginning at P2 of cycle-0, and this line is held down (asserted) because the CPU 10 asserts the CPU-hold line as seen in trace (c). The hold signal guarantees that the CPU 10 will retain control of the bus, even if another node such as an I/O 13a or 13b asserts a request. The hold signal is used for multiple-cycle transfers, where the node must keep control of the bus for consecutive cycles. After the CPU releases the hold line at the end of P4 of cycle-1, the arbiter in the interface unit 21 can release the grant line to the CPU in cycle-2. The acknowledge line is asserted by the bus interface 21 to the CPU 10 in the cycle after it has received with no parity errors the write address which was driven by the CPU in cycle-1. Not shown in FIG. 5 is another acknowledge which would be asserted by the bus interface 21 in cycle-3 if the write data of cycle-2 is received without parity error. The Ack must be asserted if no parity error is detected in the cycle following data being driven.

Figure 6:
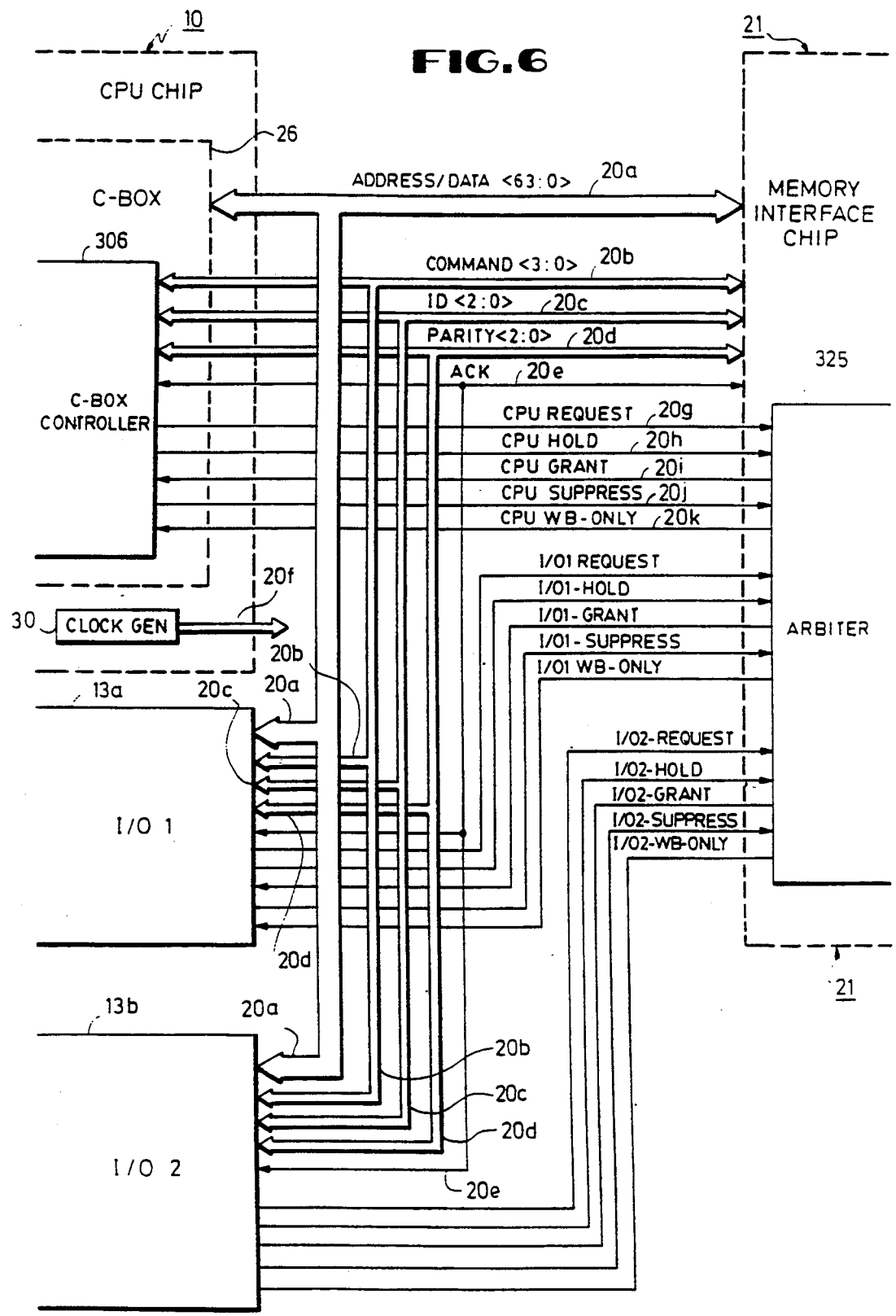
FIG. 6 is a schematic diagram of the conductors used in the CPU bus in the system of FIG. 1.

Referring to FIG. 6, the bus 20 consists of a number of lines in addition to the 64-bit, multiplexed address-/data lines 20a which carry the addresses and data in alternate cycles as seen in trace (a) of FIG. 5. The lines shared by the nodes on the bus 20 (the CPU 10, the I/O 13a, the I/O 13b and the interface chip 21) include the address/data bus 20a, a four-bit command bus 20b which specifies the current bus transaction during a given cycle (write, instruction stream read, data stream read, etc.), a three-bit ID bus 20c which contains the identification of the bus commander during the address and return data cycles (each commander can have two read transactions outstanding), a three-bit parity bus 20d, and the acknowledge line 20e. All of the command encodings for the command bus 20b and definitions of these transactions are set forth in Table A, below. The CPU also supplies four-phase bus clocks from the clock generator 30 on lines 20f.

In addition to these shared lines in the bus 20, each of the three active nodes CPU 10, I/O 13a and I/O 31b individually has the request, hold and grant lines 20g, 20h and 20i, connecting to the arbiter 325 in the memory interface chip 21. A further function is provided by a suppress line 20j, which is asserted by the CPU 10, for example, in order to suppress new transactions on the bus 20 that the CPU 10 treats as cache coherency transactions. It does this when its two-entry cache coherency queue 61 is in danger of overflowing. During the cycle when the CPU 10 asserts the suppress line 20j, the CPU 10 will accept a new transaction, but transactions beginning with the following cycle are suppressed (no node will be granted command of the bus). While the suppress line 20j is asserted, only fills and writebacks are allowed to proceed from any nodes other than the CPU 10. The CPU 10 may continue to put all transactions onto the bus 20 (as long as WB-only line 20k is not asserted). Because the in-queue 61 is full and takes the highest priority within the cache controller unit 26, the CPU 10 is mostly working on cache coherency transactions while the suppress line 20j is asserted, which may cause the CPU 10 to issue write-disowns on the bus 20. However, the CPU 10 may and does issue any type of transaction while its suppress line 20j is asserted. The I/O nodes 13a and 13b have a similar suppress line function.

The writeback-only or WB-only line 20k, when asserted by the arbiter 325, means that the node it is directed to (e.g., the CPU 10) will only issue write-disown commands, including write disowns due to write-unlocks when the cache is off. Otherwise, the CPU 10 will not issue any new requests. During the cycle in which the WB-only line 20k is asserted to the CPU 10, the system must be prepared to accept one more non-writeback command from the CPU 10. Starting with the cycle following the assertion of WB-only, the CPU 10 will issue only writeback commands. The separate writeback and non-writeback queues 63 and 62 in the cache controller unit 26 of FIG. 4 allow the queued transactions to be separated, so when the WB-only line 20k is asserted the writeback queue 62 can be emptied as needed so that the other nodes of the system continue to have updated data available in system memory 12.

When any node asserts its suppress line 20j, no transactions other than writebacks or fills must be driven onto the bus 20, starting the following cycle. For example, when the CPU 10 asserts its suppress line 20j, the arbiter 325 can accomplish this by asserting WB-only to both I/O 13a and I/O 13b, so these nodes do not request the bus except for fills and writebacks. Thus, assertion of suppress by the CPU 10 causes the arbiter 325 to assert WB-only to the other two nodes 13a and 13b. Or, assertion of suppress by I/O 13a will cause the arbiter 325 to assert WB-only to CPU 10 and I/O 13b. The hold line 20h overrides the suppress function.

The rules executed by the arbiter 325 are as follows: (1) any node may assert its request line 20g during any cycle; (2) a node's grant line 20i must be asserted before that node drives the bus 20; (3) a driver of the bus 20 may only assert its hold line 20h if it has been granted the bus for the current cycle; (4) if a node has been granted the bus 20, and it asserts hold, it is guaranteed to be granted the bus 20 in the following cycle; (5) hold line 20h may be used in two cases, one to hold the bus for the data cycles of a write, and the other to send consecutive fill cycles; (6) hold must be used to retain the bus for the data cycles of a write, as the cycles must be contiguous with the write address cycle; (7) hold must not be used to retain the bus 20 for new transactions, as arbitration fairness would not be maintained; (8) if a node requests the bus 20 and is granted the bus, it must drive the bus during the granted cycle with a valid command—NOP is a valid command—the CPU 10 takes this a step further and drives NOP if it is granted the bus when it did not request it; (9) any node which issues a read must be able to accept the corresponding fills as they cannot be suppressed or slowed; (10) if a node's WB-only line 20k is asserted, it may only drive the bus 20 with NOP, Read Data Return, Write Disown, and other situations not pertinent here; (11) if a node asserts its suppress line 20j, the arbiter 325 must not grant the bus to any node except that one in the next cycle—at the same time the arbiter must assert the appropriate WB-only lines (in the following cycle, the arbiter must grant the bus normally); (12) the rules for hold override the rules for suppress; (13) the bus 20 must be actively driven during every cycle.

The bus 20a, bits <63:0>, is employed for information transfer. The use of this field <63:0> of bus 20a is multiplexed between address and data information. On data cycles the lines <63:0> of bus 20a represent 64-bits of read or write data. On address cycles the lines <63:0> of bus 20a represent address in bits <31:0>, byte enable in bits <55:40>, and length information in bits <6/3:62>. There are several type of bus cycles as defined in Table C. Four types of data cycles are: Write Data, Bad Write Data, Read Data Return, and Read Data Error. During write data cycles the commander (e.g., the cache controller unit 26 of the CPU 10) first drives the address cycle onto bus 20, including its ID on ID bus 20c, and then drives data on bus 20a in the next cycle, again with its ID. The full 64-bits of data on bus lines 20a are written during each of four data cycles for hexaword writes; for octaword and quadword length writes, the data bytes which are written correspond to the byte enable bits which were asserted during the address cycle which initiated the transaction. During Read Data Return and Read Data Error cycles the responder drives on lines 20c the ID of the original commander (i.e., the node, such as CPU 10, which originated the read).

The address cycle on bus 20a is used by a commander (i.e., the originating node, such as CPU 10) to initiate a bus 20 transaction. On address cycles the address is driven in the lower longword <31:0> of the bus, and the byte enable and transaction length are in the upper longword. The address space supported by the bus 20 is divided into memory space and I/O space. The lower 32-bits of the address cycle bits <31:0> define the address of a bus 20 read or write transaction. The bus 20 supports a 4-Gigabyte (232 byte) address space. The most significant bits of this address (corresponding to lines <31:29>) select 512-Mb I/O space (<31:29>=111) or 3.5-Gb memory space (<31:29>=000..110). The division of the address space in the I/O region is further defined to accommodate the need for separate address spaces for CPU 10 node and I/O nodes 13a and 13b. Address bits <31:0> are all significant bits in an address to I/O space. Although the length field <63:62> on the bus 20 always specifies quadword for I/O space reads and writes, the actual amount of data read or written may be less than a quadword. The byte enable field <55:40> is used to read or write the requested bytes only. If the byte enable field indicates a 1-byte read or write, every bit of the address is significant. The lower bits of the address are sometimes redundant in view of the byte enable field, but are provided on the bus 20a so that the I/O adapters do not have to deduce the address from the byte enable field.

All reads have significant bits in their address down to the quadword (bit <3> of the address). Although fills (which are hexaword in length) may be returned with quadwords in any order, there is a performance advantage if system memory 12 returns the requested quadword first. The bus 20 protocol identifies each quadword using one of the four Read Data Return commands on bus 20b, as set forth in Table C, so that quadwords can be placed in correct locations in backup cache 15 by the cache controller unit 26, regardless of the order in which they are returned. Quadword, octaword and hexaword writes by the CPU 10 are always naturally aligned and driven onto the bus 20 in order from the lowest-addressed quadword to the highest.

The Byte Enable field is located in bits <55:40> of the bus 20a during the address cycle. It is used to supply byte-level enable information for quadword-length Own-Reads, I-stream-Reads, D-stream-Reads, and octaword-length Writes, and Write-Disowns. Of these types of transactions using byte enables, the CPU 10 generates only quadword I-stream-Reads and D-stream-Reads to I/O space, quadword Writes to I/O space, and quadword Writes and Write-Disowns to memory space.

The length field at bits <63:62> of the address cycle on the bus 20a is used to indicate the amount of data to be read or written for the current transaction, i.e., hexaword, quadword or octaword (octaword is not used in a typical embodiment).

The Bad Write Data command appearing on the bus 20b, as listed in Table C, functions to allow the CPU 10 to identify one bad quadword of write data when a hexaword writeback is being executed. The cache controller unit 26 tests the data being read out of the backup cache 15 on its way to the bus 20 via writeback queue 62. If a quadword of the hexaword shows bad parity in this test, then this quadword is sent by the cache controller unit 26 onto the bus 20 with a Bad Write Data command on the bus 20b, in which case the memory 12 will receive three good quadwords and one bad in the hexaword write. Otherwise, since the write block is a hexaword, the entire hexaword would be invalidated in memory 12 and thus unavailable to other CPUs. Of course, error recovery algorithms must be executed by the operating system to see if the bad quadword sent with the Bad Write Data command will be catastrophic or can be worked around.

As described above, the bus 20 is a 64-bit, pended, multiplexed address/data bus, synchronous to the CPU 10, with centralized arbitration provided by the interface chip 21. Several transactions may be in process at a given time, since a Read will take several cycles to produce the read-return data from the system memory 12 and meanwhile other transactions may be interposed. Arbitration and data transfer occur simultaneously (in parallel) on the bus 20. Four nodes are supported: the CPU 10, the system memory (via bus 11 and interface chip 21) and two I/O nodes 13a and 13b. On the 64-bit bus 20a, data cycles (64-bits of data) alternate with address cycles containing 32-bit addresses plus byte masks and data length fields; a parallel command and arbitration bus carries a command on lines 20b, an identifier field on lines 20c defining which node is sending, and an Ack on line 20e; separate request, hold, grant, suppress and writeback-only lines are provided to connect each node to the arbiter 325.

Error Transition Mode

The backup cache 15 for the CPU 10 is a "writeback" cache, so there are times when the backup cache 15 contains the only valid copy of a certain block of data, in the entire multi-processor system of FIG. 1. The backup cache 15 (both tag store and data store) is protected by ECC. Check bits are stored when data is written to the cache 15 data RAM or written to the tag RAM, then these bits are checked against the data when the cache 15 is read, using ECC check circuits 330 and 331 of FIG. 4. When an error is detected by these ECC check circuits, an Error Transition Mode is entered by the C-box controller 306; the backup cache 15 can't be merely invalidated, since other system nodes 28 may need data owned by the backup cache 15. In this error transition mode, the data is preserved in the backup cache 15 as much as possible for diagnostics, but operation continues; the object is to move the data for which this backup cache 15 has the only copy in the system, back out to system memory 12, as quickly as possible, but yet without unnecessarily degrading performance. For blocks (hexawords) not owned by the backup cache 15, references from the memory management unit 25 received by the cache controller unit 26 are sent to system memory 12 instead of being executed in the backup cache 15, even if there is a cache hit. For blocks owned by the backup cache 15, a write operation by the CPU 10 which hits in the backup cache 15 causes the block to be written back from backup cache 15 to system memory 12, and the write operation is also forwarded to system memory 12 rather than writing to the backup cache 15; only the ownership bits are changed in the backup cache 15 for this block. A read hit to a valid-owned block is executed by the backup cache 15. No cache fill operations are started after the error transition mode is entered. Cache coherency transactions from the system bus 20 are executed normally, but this does not change the data or tags in the backup cache 15, merely the valid and owned bits. In this manner, the system continues operation, yet the data in the backup cache 15 is preserved as best it can be, for later diagnostics.

Thus, when the cache controller unit 26 detects uncorrectable errors using the ECC circuits 330 and 331, it enters into Error Transition Mode (ETM). The goals of the cache controller unit 26 operation during ETM are the following: (1) preserve the state of the cache 15 as much as possible for diagnostic software; (2) honor memory management unit 25 references which hit owned blocks in the backup cache 15 since this is the only source of data in the system; (3) respond to cache coherency requests received from the bus 20 normally.

Once the cache controller unit 26 enters Error Transition Mode, it remains in ETM until software explicitly disables or enables the cache 15. To ensure cache coherency, the cache 15 must be completely flushed of valid blocks before it is re-enabled because some data can become stale while the cache is in ETM.

Table D describes how the backup cache 15 behaves while it is in ETM. Any reads or writes which do not hit valid-owned during ETM are sent to system memory 12: read data is retrieved from system memory 12, and writes are written to memory 12, bypassing the cache 15 entirely. The cache 15 supplies data for Ireads and Dreads which hit valid-owned; this is normal cache behavior. If a write hits a valid-owned block in the backup cache 15, the block is written back to memory 12 and the write is also sent to system memory 12. The write leaves the cache controller unit 26 through the non-writeback queue 62, enforcing write ordering with previous writes which may have missed in the backup cache 15. If a Read-Lock hits valid-owned in the cache 15, a writeback of the block is forced and the Read-Lock is sent to system memory 12 (as an Owned-Read on the bus 20). This behavior enforces write ordering between previous writes which may have missed in the cache and the Write-Unlock which will follow the Read-Lock.

The write ordering problem alluded to is as follows: Suppose the cache 15 is in ETM. Also suppose that under ETM, writes which hit owned in the cache 15 are written to the cache while writes which miss are sent to system memory 12. Write A misses in the cache 15 and is sent to the non-writeback queue 62, on its way to system memory 12. Write B hits owned in the cache 15 and is written to the cache. A cache coherency request arrives for block B and that block is placed in the writeback queue 63. If Write A has not yet reached the bus 20, Writeback B can pass it since the writeback queue has priority over the non-writeback queue. If that happens, the system sees write B while it is still reading old data in block A, because write A has not yet reached memory. For this reasons, as noted below, all writes (except for a write unlock), are placed in the non-writeback queue during ETM.

Referring again to Table D, note that a Write-Unlock that hits owned during ETM is written directly to the cache 15. There is only one case where a Write-Unlock will hit owned during ETM: if the Read-Lock which preceded it was performed before the cache entered ETM. (Either the Read-Lock itself or an invalidate performed between the Read-Lock and the Write-Unlock caused the entry into ETM.) In this case, we know that no previous writes are in the non-writeback queue because writes are not put into the non-writeback queue when we are not in ETM. (There may be I/O space writes in the non-writeback queue but ordering with I/O space writes is not a constraint.) Therefore there is not a write ordering problem as in the previous paragraph.

Table D shows that during ETM, cache coherency requests are treated as they are during normal operation, with one exception as indicated by a note. Fills as the result of any type of read originated before the cache entered ETM are processed in the usual fashion. If the fill is as a result of a write miss, the write data is merged as usual, as the requested fill returns. Fills caused by any type of read originated during ETM are not written into the cache or validated in the tag store. During ETM, the state of the cache is modified as little as possible. Table D shows how each transaction modifies the state of the cache.

Bus Interface Unit

Figure 7:
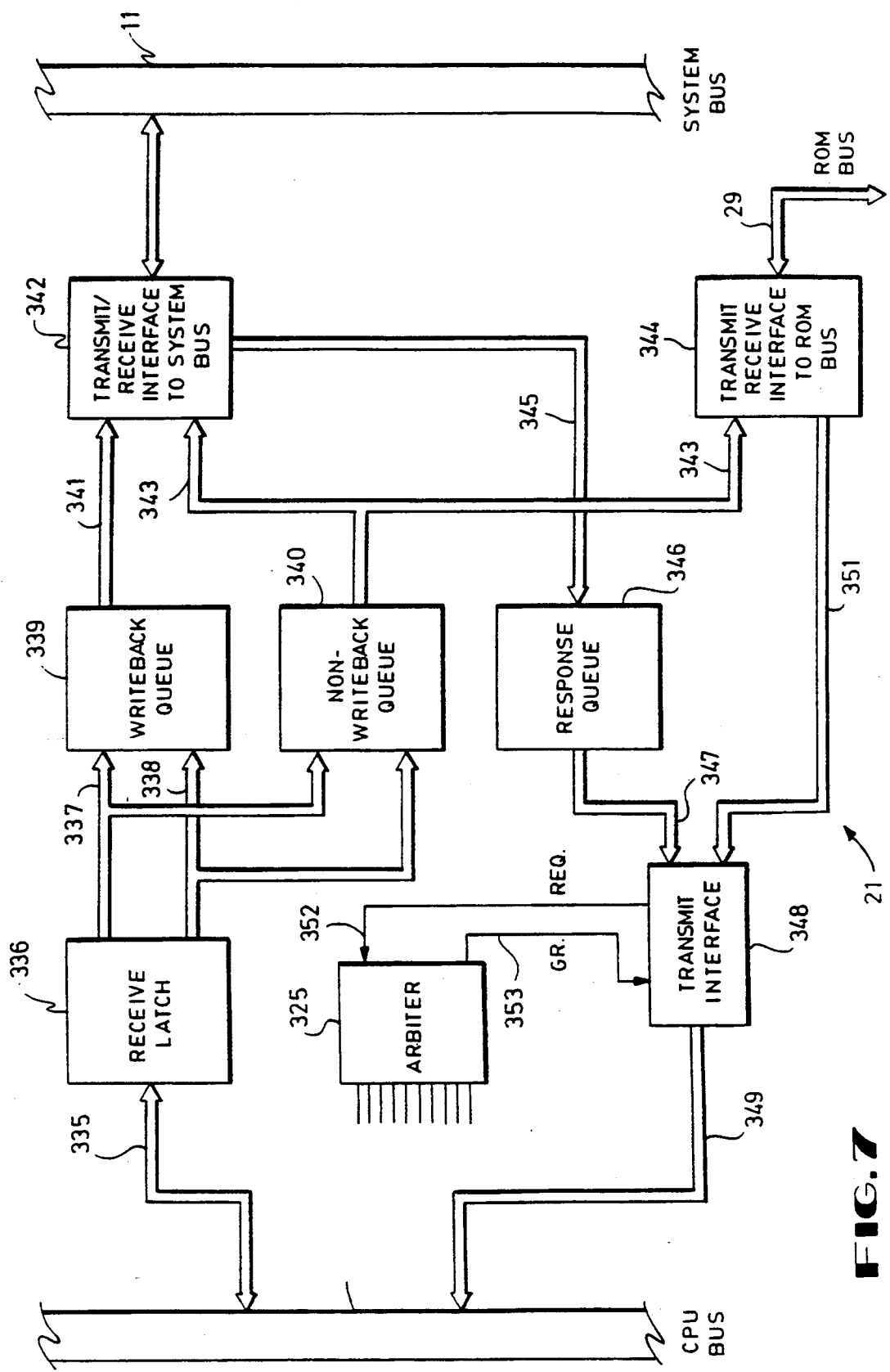
FIG. 7 is a block diagram of the bus interface and arbiter unit of the computer system of FIG. 1.

Referring now to FIG. 7, the interface unit 21 functions to interconnect the CPU bus 20 with the system bus 11. The system bus 11 is a pended, synchronous bus with centralized arbitration. Several transactions can be in progress at a given time, allowing highly efficient use of bus bandwidth. Arbitration and data transfers occur simultaneously, with multiplexed data and address lines. The bus 11 supports writeback caches by providing a set of ownership commands, as discussed above. The bus 11 supports quadword, octaword and hexaword reads and writes to system memory 12. In addition, the bus 11 supports longword-length read and write operations to I/O space, and these longword operations implement byte and word modes required by some I/O devices. Operating at a bus cycle of 64-nsec, the bus 11 has a bandwidth of 125-Mbytes/sec.

The information on the CPU bus 20 is applied by an input bus 335 to a receive latch 336; this information is latched on every cycle of the bus 20. The bus 335 carries the 64-bit data/address, the 4-bit command, the 3-bit ID and 3-bit parity as discussed above. The latch 336 generates a data output on bus 337 and a control output on bus 338, applied to a writeback queue 339 and a non-writeback queue 340, so the writebacks can continue even when non-writeback transactions are suppressed as discussed above. From the writeback queue 339, outputs 341 are applied only to an interface 342 to the system bus 11, but for the non-writeback queue 340 outputs 343 are applied to the interface 342 to the system bus 11 or to an interface 344 to the ROM bus 29. Writebacks will always be going to system memory 12, whereas non-writebacks may be to system memory 12 or to the ROM bus 29. Data received from the system bus 11 at the transmit/receive interface 342 is sent by bus 345 to a response queue 346 as described below in more detail, and the output of this response queue in applied by a bus 347 to a transmit interface 348, from which it is applied to the bus 20 by an output 349 of the interface 348. The incoming data on bus 345, going from system bus 11 to the CPU 10, is either return data resulting from a memory read, or is an invalidate resulting from a write to system memory 12 by another processor 28 on the system bus 11. Incoming data from the ROM bus 29 is applied from the transmit/receive interface 344 by bus 351 directly to the interface 348, without queuing, as the data rate is low on this channel. The arbiter 325 in the interface chip 21 produces the grant signals to the CPU 10 as discussed above, and also receives request signals on line 352 from the transmit interface 348 when the interface 348 wants command of the bus 20 to send data, and provides grant signals on line 353 to grant the bus 20 to interface 348.

Figure 9:
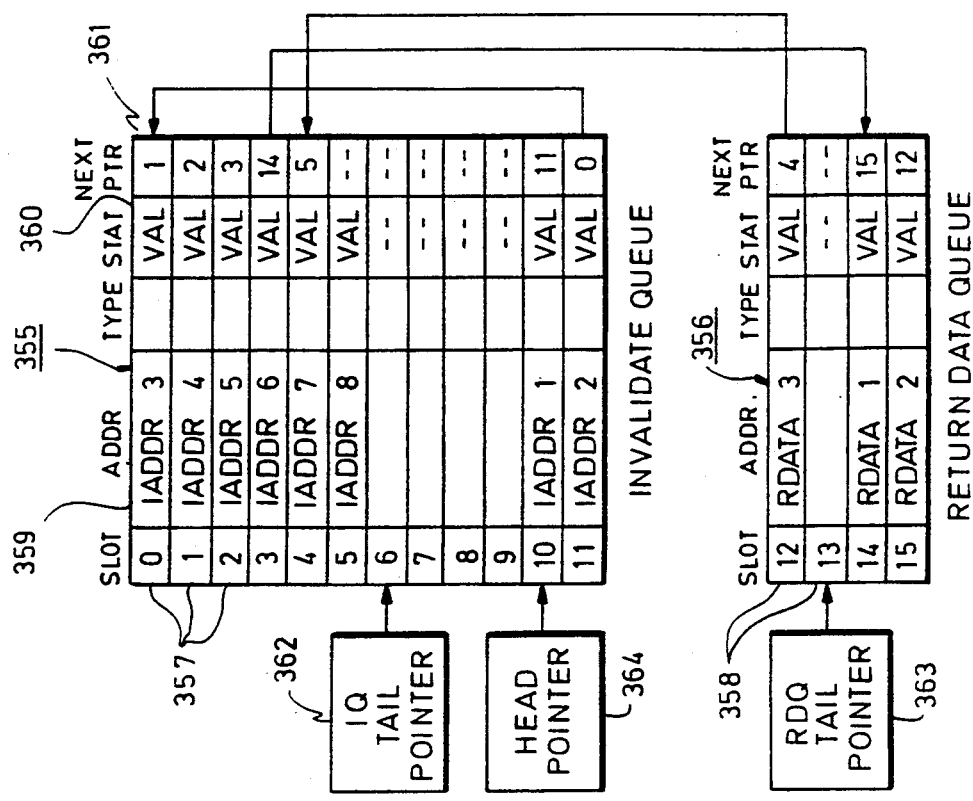
FIG. 9 is a schematic diagram showing internal organization of the invalidate queue and the return queue in the bus interface and arbiter unit of FIG. 7.
Figure 8:
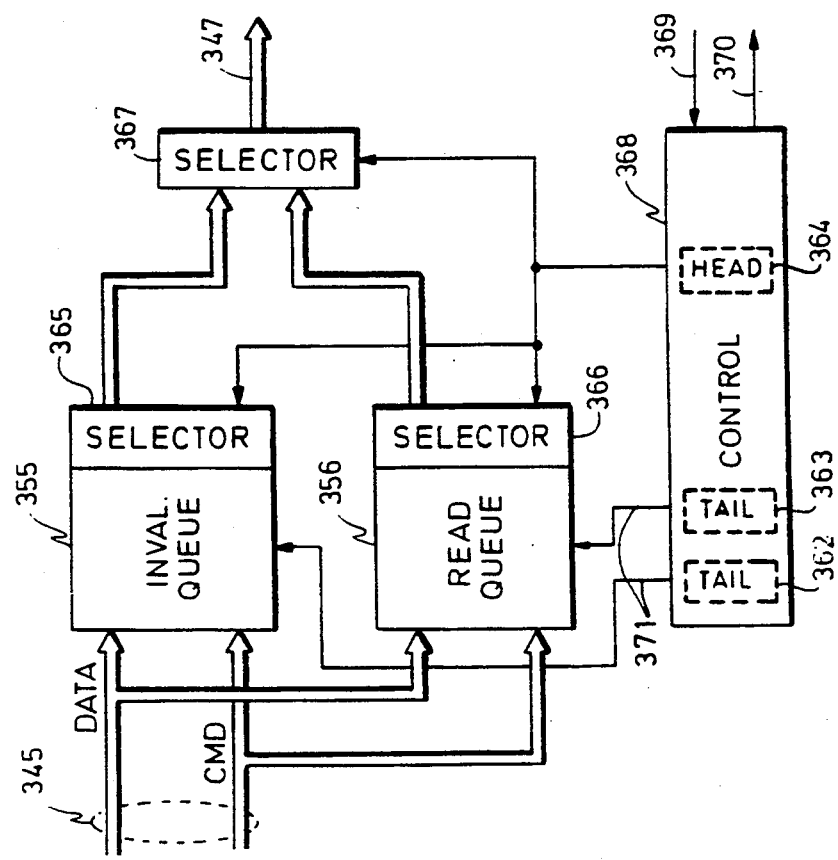
FIG. 8 is a block diagram of the invalidate queue and the return queue in the bus interface and arbiter unit of FIG. 7.

Referring to FIG. 8, the response queue 346 employs separate queues 355 and 356 for the invalidates and for return data, respectively. The invalidate queue 355 may have, for example, twelve entries or slots 357 as seen in FIG. 9, whereas the return data queue would have four slots 358. There would be many more invalidates than read data returns in a multi-processor system. Each entry or slot 357 in the invalidate queue includes an invalidate address 359, a type indicator, a status (valid) bit 360, and a next pointer 361 which points to the slot number of the next entry in chronological sequence of receipt. A tail pointer 362 is maintained for the queue 355, and a separate tail pointer 363 is maintained for the queue 356; when a new entry is incoming on the bus 345 from the system bus 11, it is loaded to one of the queues 355 or 356 depending upon its type (invalidate or read data), and into the slot 357 or 358 in this queue as identified by the tail pointer 362 or 363. Upon each such load operation, the tail pointer 362 or 363 is incremented, wrapping around to the beginning when it reaches the end. Entries are unloaded from the queues 355 and 356 and sent on to the transmitter 348 via bus 347, and the slot from which an entry is unloaded is defined by a head pointer 364. The head pointer 364 switches between the queues 355 and 356; there is only one head pointer. The entries in queues 355 and 356 must be forwarded to the CPU 10 in the same order as received from the system bus 11. The head pointer 364 is an input to selectors 365, 366 and 367 which select which one of the entries is output onto bus 347. A controller 368 containing the head pointer 364 and the tail pointer 362 and 363 sends a request on line 369 to the transmitter 348 whenever an entry is ready to send, and receives a response on line 370 indicating the entry has been accepted and sent on to the bus 20. At this time, the slot just sent is invalidated by line 371, and the head pointer 364 is moved to the next pointer value 361 in the slot just sent. The next pointer value may be the next slot in the same queue 355 or 356, or it may point to a slot in the other queue. Upon loading an entry in the queues 355 or 356, the value in next pointer 361 is not inserted until the following entry is loaded since it is not known until then whether this will be an invalidate or a return data entry.

The interface chip 21 provides the memory interface for CPU 10 by handling CPU memory and I/O requests on the system bus 11. On a memory Read or Write miss in the backup cache 15, the interface 21 sends a Read on system bus 11 and receives a cache fill operation to acquire the block from system memory 12. The interface chip 21 monitors memory Read and Write traffic generated by other nodes on the system bus 11 such as CPUs 28 to ensure that the CPU 10 caches 14 and 15 remain consistent with main system memory 12. If a Read or Write by another node hits the cache 15, then a Writeback or Invalidate is performed by the CPU 10 chip as previously discussed. The interface chip 21 also handles interrupt transactions to and from the CPU.

The system bus 11 includes a suppress signal as discussed above with respect to the CPU bus 20 (i.e., line 20j), and this is used to control the initiation of new system bus 11 transactions. Assertion of suppress on the system bus 11 blocks all bus commander requests, thus suppressing the initiation of new system bus 11 transactions. This bus 11 suppress signal may be asserted by any node on bus 11 at the start of each bus 11 cycle to control arbitration for the cycle after the next system bus 11 cycle. The interface chip 21 uses this suppress signal to inhibit transactions (except Writeback and Read Response) on the system bus 11 when its invalidate queue 355 is near full in order to prevent an invalidate queue 355 overflow.

The interface chip 21 participates in all bus 20 transactions, responding to Reads and Writes that miss in the backup cache 15, resulting in a system bus 11 Ownership Read operation and a cache fill. The interface chip 21 latches the address/data bus 20a, command bus 20b, ID bus 20c, and parity 20d, into the latch 336 during every bus 20 cycle, then checks parity and decodes the command and address. If parity is good and the address is recognized as being in interface chip 21 space, then Ack line 20e is asserted and the information is moved into holding registers in queues 339 or 340 so that the latches 336 are free to sample the next cycle. Information in these holding registers will be saved for the length of the transaction.

The arbiter 325 for the bus 20 is contained in the interface chip 21. The two nodes, CPU 10 and interface chip 21, act as both Commander and Responder on the bus 20. Both the CPU 10 and interface chip 21 have read data queues which are adequate to handle all outstanding fill transactions. CPU-suppress line 20j inhibits grant for one bus 20 cycle during which the WB-Only signal is asserted by interface chip 21 on line 20k.

If the in-queue 61 in the cache controller unit 26 fills up, it asserts CPU-suppress line 20j and interface chip 21 stops sending invalidates to the bus 20 (the system bus 11 is suppressed only if the input queue 355 of the interface chip 21 fills up). Interface chip 21 continues to send fill data until an invalidate is encountered.

When the interface chip 21 writeback queue 339 fills up, it stops issuing Grant to CPU 10 on line 20i. If the interface chip 21 non-writeback queue 340 fills up, it asserts WB-Only to CPU 10 on line 20k.

The following CPU 10 generated commands are all treated as a Memory Read by the interface chip 21 (the only difference, seen by the interface chip 21, is how each specific command is mapped to the system bus 11: (1) Memory-space instruction-stream Read hexaword; (2) Memory-space data-stream Read hexaword (ownership); and (3) Memory-space data-stream Read hexaword (no lock or ownership). When any of these Memory Read commands occur on the bus 20 and if the Command/Address parity is good, the interface chip 21 places the information in a holding register.

For Read Miss and Fill operations, when a read misses in the CPU 10 CPU, the request goes across the bus 20 to the interface chip 21. When the memory interface returns the data, the CPU 10 cache controller unit 26 puts the fill into the in-queue 61. Since the block size is 32-bytes and the bus 20 is 8-bytes wide, one hexaword read transaction on the bus 20 results from the read request. As fill data returns, the cache controller unit 26 keeps track of how many quadwords have been received with a two-bit counter in the fill CAM 302. If two read misses are outstanding, fills from the two misses may return interleaved, so each entry in the fill CAM 302 has a separate counter. When the last quadword of a read miss arrives, the new tag is written and the valid bit is set in the cache 15. The owned bit is set if the fill was for an Ownership Read.

For Write Miss operations, if the CPU 10 tag store lookup in cache 15 for a write is done and the ownership bit is not set, an ownership read is issued to the interface chip 21. When the first quadword returns through the in-queue 61, the write data is merged with the fill data, ECC is calculated, and the new data is written to the cache RAMs 15. When the fourth quadword returns, the valid bit and the ownership bit are set in the tag store for cache 15, and the write is removed from the write queue.

For CPU Memory Write operations, the following four CPU 10 generated commands are treated as Memory Writes by the interface chip 21 (the only difference, seen by the interface chip 21, is how each specific command is mapped to the system bus 11: (1) Memory-space Write Masked quadword (no disown or unlock); (2) Memory-space Write Disown quadword; (3) Memory-space Write Disown hexaword; and (4) Memory-space Bad Write Data hexaword.

For deallocates due to CPU Reads and Writes, when any CPU 10 tag lookup for a read or a write results in a miss, the cache block is deallocated to allow the fill data to take its place. If the block is not valid, no action is taken for the deallocate. If the black is valid but not owned, the block is invalidated. If the block is valid and owned, the block is sent to the interface chip 21 on the bus 20 and written back to system memory 12 and invalidated in the tag store. The Hexaword Disown Write command is used to write the data back. If a writeback is necessary, it is done immediately after the read or write miss occurs. The miss and the deallocate are contiguous events for the cache controller and are not interrupted for any other transaction.

For Read-Lock and Write-Unlock operations, the CPU 10 cache controller unit 26 receives Read Lock/Write Unlock pairs from the memory management unit 25; it never issues those commands on the bus 20, but rather uses Ownership Read-Disown Write instead and depends on use of the ownership bit in system memory 12 to accomplish interlocks. A Read lock which does not produce an owned hit in the backup cache 15 results in an ORead on the bus 20, whether the cache 15 is on or off. When the cache is on, the Write Unlock is written into the backup cache 15 and is only written to memory 12 if requested through a coherence transaction. When the cache 15 is off, the Write Unlock becomes a Quadword Disown Write on the bus 20.

Regarding Invalidates, the interface chip 21 monitors all read and write traffic by other nodes 28 to system memory 12 in order to maintain cache coherency between the caches 14 and 15 and main system memory 12 and to allow other system bus 11 nodes access to memory locations owned by the CPU 10. The interface chip 21 will forward the addresses of these references over the bus 20 to the CPU 10 cache controller unit 26. The cache controller unit 26 will lookup the address in the tag store of cache 15 and determine if the corresponding cache subblock needs to be invalidated or written back. There is no filtering mechanism in the interface chip 21 for invalidates, which means that the bus 20 must be used for every potential invalidate.

The CPU 10 does not confirm cache coherency cycles and instead expects the interface chip 21 to assert Ack for its own invalidate cycles. A cache coherency cycle is a read or write not driven by the CPU 10. When the interface chip 21 detects a memory reference by another node 28 on the system bus 11, it places the address into the responder queue 346. This address is driven onto the bus 20 and implicitly requests the cache controller unit 26 to do a cache lookup.

The invalidate queue 355 is twelve entries deep in the example. The interface chip 21 uses the system bus 11 suppress line to suppress bus 11 transactions in order to keep the responder queue 355 from overflowing. If (for example) ten or more entries in the responder 355 queue are valid, the interface chip 21 asserts the suppress line to system bus 11. Up to two more bus 11 writes or three bus 11 reads can occur once the interface chip 21 asserts the suppress signal. The suppression of system bus 11 commands allows the interface chip 21 and CPU 10 cache controller unit 26 to catch up on invalidate processing and to open up queue entries for future invalidate addresses. When the number of valid entries drops below nine (for example), the interface chip 21 deasserts the suppress line to system bus 11.

A potential problem exists if an invalidate address is received which is in the same cache subblock as an outstanding cacheable memory read. The cache controller unit 26 tag lookup will produce a cache miss since that subblock has not yet been validated. Since the system bus 11 request that generated this invalidate request may have occurred after the command cycle went on the system bus 11, this invalidate must be processed. The CPU 10 cache controller unit 26 maintains an internal state which will force this cache subblock to be invalidated or written back to memory once the cache fill completes. The cache controller unit 26 will process further invalidates normally while waiting for the cache fill to complete.

Some previous computer systems used a non-pended bus and had separate invalidate and return data queues performing the functions of the queues 355 and 356. These prior queues had no exact "order of transmission" qualities, but rather "marked" the invalidates as they came into the appropriate queue such that they were processed before any subsequent read.

The CPU 10, however, uses pended busses 11 and 20, and invalidates travel along the same path as the return data. It is necessary to retain strict order of transmission, so that invalidates and return data words must be sent to the CPU 10 for processing in exactly the same order that they entered the queue 346 from the system bus 11. This goal could be accomplished by simply having one unified queue, large enough to handle either invalidates or return data words, but this would unduly increase the chip size for the interface chip 21. Specifically, in practice, one unified queue means that each slot would have to be large enough to accommodate the return data, since that word is the larger of the two. In fact, the return data word and its associated control bits are more than twice as large as the invalidate address and its control bits. The invalidate portion of the queue will also have to be around twice the size of the return data portion. Thus, around 2/3 of the queue would be only half utilized, or ⅓ of the queue being wasted.

In addition, the system bus 11 protocol mandates that return data must have room when it is finally delivered from the system memory 12. If the queue is unified, invalidates might take up space that is needed for the return data. Assuming that one hexaword of return data is expected at any particular time (since the major source of return data will be hexaword ownership reads), four queue slots must be guaranteed to be free.

The bus protocol uses the bus suppression mechanism as previously discussed to inhibit new invalidates while allowing return data to be delivered. Due to the inherent delay in deciding when the suppression signal must be asserted, and a further lag in its recognition in the arbitration unit 325, there must be three or four extra invalidate slots to accommodate invalidates during this suppression dead zone. If we wish to allow four slots for real invalidates, the invalidate portion of the queue must be seven or eight slots in length. Any fewer slots would mean frequent system bus 11 suppression. This means as many as twelve slots would be needed for the combined data/invalidate queue, each slot large enough to accommodate the data word and its associated control bits. We could have fewer slots and suppress earlier, or more slots and make the queue even larger. Either way, the queue is growing twice as fast as it has to, given our goal. If we wish to allow more than one outstanding read, the queue must be 15 or 16 slots, since a brute force approach is necessary.

Preferably, the invalidate and read data queues are split into separate entities 355 and 356, each being only as large (in depth and length) as necessary for its task. The problem, of course, is how to guarantee strict order of transmission. This is to be done using a hardware linked list between the two queues implemented in this example by the next pointer fields 361 and the head pointer 364. Each slot entry has a "next" pointer 361 that instructs the unload logic where to look for the next data entity (either invalidate or read data).

The approach of FIGS. 8 and 9 has several advantages over the use of a single queue, without greatly increasing the complexity of the design. The advantages all pertain to providing the necessary performance, while reducing the chip size. The specific main advantages are: (1) The same performance obtained with a large, unified queue can be realized with far less space using the split queue method; (2) Each queue can be earmarked for a specific type of data, and there can be no encroaching of one data type into the other. As such, the two types of queues (invalidate and return data) can be tuned to their optimum size. For example, the invalidate queue might be seven (small) slots while the read data queue might be five or six (large) slots. This would provide a smooth read command overlap, while allowing invalidates to be processed without unduly suppressing the system bus 11; (3) The read data queue 356 can be increased to accommodate two outstanding reads without worrying about the size of the invalidate queue, which can remain the same size, based upon its own needs.

This same function can be done using a universal pointer for each slot, or by merely having a flag that says "go to the other queue now until switched back". Since the invalidate queue 335 and the read data queue 356 are each completely circular within themselves, strict ordering is preserved within the overall responder queue 346.

Cache Coherency With Outstanding Fills

As introduced above, the fill CAM 302 in FIG. 4 holds addresses of outstanding misses to the back-up cache 15. By accessing the fill CAM before accessing the back-up cache 15, further access to the missed cache block for another memory management unit command or a cache coherency transaction is stalled until the fill is completed. When the cache is off or in ETM, however, writes are not checked for block conflict, but are sent immediately to memory.

Preferably, the fill CAM is a two-entry content addressable memory, and each entry includes a number of status bits associated with the address of the outstanding miss, as shown in Table F.

A miss to a cache block in the back-up cache 15 is outstanding until the fill data has been received from the system memory 12. When a read transaction is issued to the system memory 12 to request the fill data, the fill CAM entry is validated by setting the valid bit, the address field is loaded, and the appropriate status bits RDLK, IREAD, OREAD, WRITE, and TO_MBOX are set depending on the particular command, from the memory management unit, that required the access to the back-up cache 15. RIP, OIP, RDLK_FL_DONE, and REQ_FILL_DONE are cleared. If the cache is off, in ETM, or the miss is for an I/O reference, DNF is set; otherwise, it is cleared. COUNT is set to zero if four fill quadwords are expected; it is set to 3 if only one quadword is expected.

The fill CAM status bits are set under certain conditions upon the return of fill data or cache coherency commands from the CPU bus that are associated with the miss address in the fill CAM. If an abort request arrives from the memory management unit 25, and the entry is marked IREAD, then the TO_MBOX bit is cleared. When the data returns in this case, it will be written into the back-up cache (if DNF is not set), but it will not be sent to the memory management unit 25.

When the CPU 10 receives a cache coherency transaction from the CPU bus 20, the cache block address of the transaction is compared to the addresses in the fill CAM 302. If there is a match and the matching entry is valid, then the transaction is addressed to a cache block which has an outstanding fill request. The transaction is handled as shown in TABLE G. If the transaction is OREAD or WRITE (i.e., an ownership invalidating transaction), the fill CAM status bit OIP (OREAD invalidate pending) in the matching entry is set, and an invalidate is sent immediately to the primary cache 14. If the transaction is DREAD or IREAD (i.e., a read invalidating transaction) and the OREAD bit in the matching entry is set, then the fill CAM status bit RIP in the matching entry is set.

As the fills are received, the fill data is forwarded to the memory management unit 25 for use by the CPU 10. When all of the fills for the outstanding miss are received by the cache controller 26, and DNF is not set, then the action taken immediately after the fill is complete is dependent on the state of the RIP and OIP status bits of the fill CAM entry corresponding to the outstanding miss, as specified in TABLE H. In particular, if OIP is set and DNF is not set, then an Oinval operation is performed; the just-filled cache block is written back to memory if the refilled cache block is owned by the cache, and the just-filled cache block is invalidated by clearing both VALID and OWNED in the cache block. If RIP is set and DNF is not set, then an Rinval operation is performed; the just-filled cache block is written back to memory, and the just-filled cache block is set to a valid-unowned state by clearing OWNED in the cache block.

There are several error cases where RIP or OIP may be set, indicating the need for a cache coherence transaction, but the cache controller 26 will not execute the transaction. The fill sequence, for example, may fail by ending in RDE (Read Error) or by not refilling the cache within a predetermined duration of time (a fill timeout error). If the fill was meant for the primary cache 14 and ends in an error, the primary cache invalidates itself. Another error case, further described below, occurs when a READ LOCK sequence does not conclude with a corresponding WRITE UNLOCK, but instead concludes with a write-one-to-clear to the RDLK bit to an error status register (CEFSTS; 308 in FIG. 4).

By recording a cache coherency transaction for an outstanding miss in the fill CAM, execution of the transaction is deferred until the fill is completed. During the fill, the fill data is returned to the memory management unit 25 of the CPU 10, which uses the data in the usual fashion. Therefore, the memory operation causing the miss is completed before the cache coherency transaction is executed. If the miss resulted because the cache 15 did not have data requested by the execution unit 23, for example, the fill data will be returned to the execution unit 23 before the data is invalidated by the cache coherency transaction. Moreover, the other CPU 28 which issued the cache coherency transaction does not have to reissue the transaction as it would have in any "retry" method; instead, the CPU with the outstanding miss records the fact that the cache coherency transaction was received (by setting RIP or OIP) and executes the transaction when it is able to do so.

Preventing Access to Locked Memory

When the cache controller 26 receives a READ LOCK command from the memory management unit 25, further access to the cache block specified by the READ LOCK command must be stalled until the corresponding WRITE UNLOCK command is received and executed by the cache controller 26, as was introduced above. One way to perform this function would be to store the address of the outstanding read lock in a separate register, and to check the address in this register of any new memory access command from the memory management unit 25 or cache coherency transaction from the CPU bus 20; if the address matched, that command or transaction would be stalled until the corresponding WRITE LOCK command would be executed. In the cache controller 26 of FIG. 4, however, the fill CAM 302 is used to obtain the same result. The primary purpose of the fill CAM 302 is to hold the addresses and other information related to memory access commands which have missed in the back-up cache so that further accesses to those cache blocks can be prevented until the cache fills are returned from memory. But the fill CAM 302 is also used to hold outstanding READ LOCK information, so that access to a locked cache block is also prevented until the corresponding WRITE UNLOCK is executed.

In a preferred arrangement, when the cache controller 26 receives a READ LOCK command from the memory management unit 25, the cache controller places the block address specified by the READ LOCK command into an entry of the fill CAM 302, regardless of whether or not the block address hits in the back-up cache 15. At the same time, the following control bits are set in that fill CAM entry: RDLK (to indicate that a READ LOCK is in progress); OREAD (to indicate that the READ LOCK is an Ownership-Read type of transaction); TO_MBOX (if the returning fill data is to be sent to the memory management unit 25); and VALID (to indicate that the entry is currently valid).

While the READ LOCK is in progress (i.e., recorded in the fill CAM) and before the corresponding WRITE UNLOCK is executed, the cache controller 26 may receive a cache coherency transaction from the CPU bus. Such a transaction may eventually result in either an invalidate of a cache block (Rinval) or a deallocate of an owned cache block (Oinval). Such a result must be prevented so long as the READ LOCK is in progress upon the cache block referenced by the cache coherency transaction. When such a transaction is received, its address is compared to any valid address in the fill CAM 302, including any READ LOCK address in the fill CAM. If the comparison indicates a match, then either RIP (Read Invalidate Pending) or OIP (Oread Invalidate Pending) is set in the fill CAM entry having the matching address, so that execution of the cache coherency transaction is deferred until the entry is removed from the fill CAM, as described above for handling a cache coherency transaction upon a cache block having an outstanding fill. If a fill CAM entry is for a READ LOCK, then the entry is not removed from the fill CAM until the corresponding WRITE UNLOCK is executed. Therefore, a cache coherency transaction deferred by the READ LOCK is not executed until the corresponding WRITE UNLOCK is executed.

If the RDLK bit is set for either of the fill CAM entries, new IREADS (Instruction Reads) and new DREADS (Data Stream Reads) are stalled. Fills, cache coherency transactions, and writes are allowed to continue. The only write which should appear in the write queue (60 in FIG. 4) is the WRITE UNLOCK corresponding to the READ LOCK, unless the fills for the READ LOCK fail to occur within a predetermined duration of time, causing the READ LOCK to terminate in an error. This READ LOCK error interrupts the normal sequence of microcode execution by the execution unit 23, so that the corresponding WRITE UNLOCK does not follow the READ LOCK.

When processing by the cache controller 26 terminates in an error, information related to the fill CAM 302 is available from a pair of registers 307, 308 (FIG. 4) that can be accessed by the execution unit via IPR READ commands transmitted by the memory management unit 25 to the cache controller 26. Error information is also available from internal processor status registers 309, 310, and 311 which store address information from the internal address bus 288, data from the internal data bus 289, and data from the bus 292, respectively. Therefore, when an error condition arises in the cache controller 26, an error signal is sent to the micro-controller 24 (FIG. 1) of the execution unit 23, permitting the micro-controller to execute an error handling sequence which may access the internal processor registers of the cache controller.

In the case of a READ LOCK error, the execution unit microcode may resume normal instruction execution by causing the memory management unit 25 to send an IPR WRITE command to the CEFSTS 308 (Fill CAM Error Register) which has the side effect of clearing any set RDLK bits and VALID bits in the fill CAM 302. Therefore, the cache controller 26 becomes free to resume processing of commands from the memory management unit 25 and cache coherency transactions from the CPU bus 20.

A description of the fields in the CEFSTS register 308 is given in TABLE I. Each field is either a type WC (write-to-clear) or type RO (read-only). When a problem related to an outstanding fill occurs, the CEFSTS register holds information related to the problem, and the CEFADR register 307 holds the cache block address of the outstanding fill. If an outstanding fill times out or is terminated with RDE, the CEFADR register 307 and the CEFSTS register 308 are loaded and locked. The CEFADR register 307 is a read-only register.

The CEFSTS register 308 is a read-write register. Only its lowest five bits and its UNEXPECTED_FILL bit may be written, and then only to clear them after an error. CEFSTS is not affected by a system reset.

Referring now to the individual fields in the CEFSTS register 308, RDLK is set to show that a READ_LOCK is in progress. This bit is write-one-to-clear. The side effect of performing a write-one-to-clear to this bit is to clear the VALID bit for an entry which had its RDLK bit set; this has the effect of clearing out the FILL_CAM entry. This is the same action which is taken when a WRITE_UNLOCK is received. Microcode uses this functionality during certain error sequences; the bit is implemented in the zero position to make the microcoding as efficient as possible. The RDLK bit is normally not read as a one by software, because the microcode ensures that the READ_LOCK-WRITE_UNLOCK sequence is an indivisible operation. If, however, the first quadword of a READ_LOCK is returned successfully and then the transaction either times out or is terminated in RDE, CEFSTS is loaded with the RDLK bit set.

OREAD indicates that the transaction in error was an OREAD; the OREAD may have been done for a WRITE, a READ LOCK, or a READ MODIFY command.

WRITE indicates that the transaction in error was an OREAD done because of a WRITE command.

TO_MBOX indicates that data returning for the read was to be sent to the memory management unit 25.

RIP (Read Invalidate Pending) is set when a cache coherency transaction due to a read on the CPU bus is requested for a block which has Oread fills outstanding at the time. This triggers a writeback of the block when the fill data arrives; a valid copy of the data is kept in the back-up cache 15.

OIP (Oread Invalidate Pending) is set when a cache coherency transaction due to an OREAD or a WRITE on the CPU bus is requested for a block which has OREAD fills outstanding at the time. This triggers a writeback and invalidate of the block when the fill data arrives.

DNF (Do Not Fill) is set when data for a read is not to be written into the backup cache 15. This is the case when the cache is off, in ETM, or when the read is to I/O space. The assertion of this bit prevents the block from being validated in the back-up cache.

RDLK_FL_DONE is set in the fill CAM when a READ LOCK hits in the back-up cache 15 or the last fill arrives from the BIU for a READ_LOCK. Once this is set, the corresponding WRITE_UNLOCK is allowed to proceed. This overrides the fill CAM block conflict on the WRITE UNLOCK which is inevitable since the READ_LOCK is held in the fill CAM until the WRITE UNLOCK is executed.

REQ_FILL_DONE is set when the requested quadword of data was successfully received from the CPU bus 20. This is used to allow error handling software to differentiate between an error which occurred before the requested data was received, and an error which occurred after the requested data was received. If the error occurs while the requested data is being returned, such as the requested data being returned with RDE, it is as if the requested data was not received. REQ_FILL_DONE will not be set because the requested data was not successfully received.

COUNT consists of two bits which indicate how many of the expected four quadwords have been returned successfully from memory for this read. If they are 00(BIN), no quadwords have returned, if they are 01(BIN), one quadword has returned, etc. If the entry was for a quadword read, the count bits are set to 11(BIN) when the reference is sent out. As an example, if RDE is returned before any other RDR returns for a hexaword request, COUNT will be 00(BIN), to indicate that no quadwords of data were successfully returned.

UNEXPECTED_FILL is set to indicate that an RDE or an RDR cycle was received from the CPU bus 20 with an ID for which the fill CAM entry was not valid. When UNEXPECTED_FILL is set, CEFSTS and CEFADR are loaded and locked. RDE will also be set if the unexpected fill was an RDE rather than an RDR. UNEXPECTED_FILL is a write-one-to-clear bit which is set by hardware and cleared by software.

The LOCK bit is set when a read transaction which has been sent to memory terminates in Read Data Error or in Timeout. At the same time, all information corresponding to the read is loaded from the fill CAM 302 into the CEFSTS register 308. When the LOCK bit is set, one of TIMEOUT, RDE, or UNEXPECTED_FILL is also set to indicate the type of error. Once the LOCK bit is set, none of the information in CEFSTS 308 or CEFADR 307 changes, with the possible exception of LOST_ERR, until the LOCK bit is cleared.

TIMEOUT is set when a read transaction which was sent to the CPU bus 20 times out for some reason. When TIMEOUT is set, the LOCK bit is also set. A hardware timer sets the TIMEOUT bit and software clears it by writing a one to that location.

RDE (Read Data Error) is set when a read transaction which was sent to the CPU bus 20 terminates in RDE. When the RDE bit is set, the LOCK bit is also set. The UNEXPECTED_FILL bit will be set as well, if the RDE was actually unexpected (no read corresponding to the RDE was outstanding when that RDE was received). Hardware sets the RDE bit and software clears it by writing a one to that location.

The LOST_ERR bit is set when CEFSTS is already locked and another RDE, timeout, or unexpected fill error occurs. This indicates to software that multiple errors have happened and state has not been saved for every error. Hardware sets the LOST_ERR bit and software clears it by writing a one to that location.

IDO corresponds to the signal on the CPU bus 20 which was issued with the read that failed, and indicates which one of the two FILL_CAM entries was used to save information about the transaction while it was outstanding.

IREAD indicates that the transaction in error was an IREAD.

Read/Write Ordering Using Conflict Bits

As described above with reference to FIG. 4, a data stream read request received by the cache controller 26 from the memory management unit 25 is held in a data read latch 299. This D-read latch 299 is one entry deep and holds the address of the data stream read request and a five-bit code indicating the specific read command. The data stream read requests include DREAD, READ MODIFY, READ LOCK, and IPR READ commands.

An IREAD command received by the cache controller unit 26 from the memory management unit 25 is held in an instruction read latch 300. This I-read latch 300 is one entry deep and holds the address of the IREAD command, together with a five-bit code for the IREAD command.

Write requests received by the cache controller 26 from the memory management unit 25 are packed in a write packer 301 and then fed through a write queue 60. The write requests include IPR WRITES, WRITES, and WRITE UNLOCKS.

The write packer accumulates memory-space writes to the same quadword which arrive sequentially, so that only one write has to be done into the back-up cache 15. Only WRITE commands to memory space to the same quadword are packed together. When a memory space WRITE command to a different quadword is received, the write packer 301 is flushed by transferring its contents into the write queue 60. Other kinds of write requests pass immediately from the write packer 301 into the write queue 60 after the write packer 301 is flushed by transferring any existing data into the write queue. The write packer 301 is also flushed if an IREAD or DREAD arrives specifying the same hexaword as that of the entry in the write packer. The write packer 301 is also flushed whenever any condition for flushing the write queue, as described below, is met on the entry in the write packer. Moreover, the execution unit (23 in FIG. 1) can write to a control register to set a "disable pack" bit so that every write passes directly through the write packer without delay.

Normally, the C-box controller (306 in FIG. 4) processes the read and write requests in the following order: first, any request in the D-read latch 299; second, any request in the I-read latch 300; and third, any request at the head of the write queue 60. Data reads are given priority over instruction reads in order to minimize the stalling of instruction execution for need of data by an already-decoded instruction. Reads should be given priority over writes because a read is needed for the current processing of an instruction, whereas a write is the result of already executed instruction. However, a read which follows a write to the same hexaword (i.e., the same cache block) should not be executed before the write, or else the read might return "stale" data.

To permit the reads to bypass the writes whenever possible, the write packer 301 and the write queue 60 include conflict bits associated with their entries. In particular, one DWR conflict bit and one IWR conflict bit are associated with the write packer 301 and with each write queue entry, to indicate whether that entry has a so-called write-read conflict with any data read request in the D-read latch 299 or with any instruction read request in the I-read latch 300, respectively.

When a data read request is received in the D-read latch 299, its hexaword address is compared to the write addresses in the write packer 301 and in all entries in the write queue 60. Any entry with a matching hexaword address has its corresponding DWR conflict bit set. The DWR conflict bit is also set if the write packer or the write queue entry is an IPR WRITE command, a WRITE UNLOCK command, or an I/O space write. If any DWR conflict bit is set, the write queue 60 takes priority over the data read request allowing the writes up to the point of the conflicting write to execute first.

In a similar fashion, when an instruction read is received in the I-read latch 300, its hexaword address is compared to the write addresses in the write packer 301 and in all entries in the write queue 60. Any entry with a matching hexaword address has its corresponding IWR conflict bit set. The IWR conflict bit is also set if the write packer or the write queue entry is an IPR WRITE command, a WRITE UNLOCK command, or an I/O space write. If any IWR conflict bit is set, the write queue takes priority over instruction reads, allowing the writes up to the point of the conflicting write to execute first.

All of the DWR conflict bits are OR'd together to make one signal which is sent to the C-box controller 306 to indicate that a write conflict exists on the current entry of the D-read latch 299. Similarly, all of the valid IWR conflict bits are OR'd together to make one signal which is sent to the C-box controller 306 to indicate that a write conflict exists on the current entry of the I-read latch 300. The controller 306 uses these signals to decide how to prioritize the execution of the commands currently in the D-read latch 299, I-read latch 300, and write queue 60.

As each write is executed, the conflict bits and valid bit of the entry are cleared. After the execution of the last write which conflicts with the data read in the D-read latch 299, there are no more DWR bits set, and the data read in the D-read latch 299 takes priority again, even if other writes arrived after the data read. In this way, a data read which conflicts with previous writes is not done until those writes are done, but once those writes are done, the data read proceeds.

The analogous statement is true for an instruction read which has a conflict. Also, if the IWR conflict bit of a valid write queue entry is set and the instruction read is aborted before the conflicting write queue entry is processed, the write queue 60 continues to take precedence over the I-read latch 300 until the conflicting entry is retired.

If both a data read request in the D-read latch 299 and an instruction read in the I-read latch 300 have a conflict in the write queue 60, writes take priority until one of the reads no longer has a conflict. If the data read request no longer has a conflict, then the data read is done. Then the WRITE_QUEUE continues to have priority over the I-read latch 300 since the instruction read has a conflict, and when the conflicting writes are done, the instruction read may proceed. If another data read arrives in the meantime, it may be allowed to bypass both the writes and the instruction read if it has no conflicts.

In a similar fashion, the DWR and IWR conflict bits enforce read/write ordering to ensure that prior write requests in the write queue are serviced before a read request when the read request is a READ LOCK, an IPR READ, or an I/O space read, and when a prior write request is a WRITE UNLOCK, an IPR WRITE, or an I/O space write.

In particular, when a READ LOCK command arrives from the memory management unit 25, DWR conflict bits for all valid entries in the write packer 301 and the write queue 60 are set so that all writes preceding the READ LOCK are done before the READ LOCK is done. When any IPR READ command arrives from the memory management unit 25, all DWR conflict bits for valid entries in the write packer 301 and the write queue 60 are set, so that previous writes complete first. When any instruction stream I/O space read arrives, all IWR conflict bits for valid entries in the write packer 301 and the write queue 60 are set, so that previous writes complete first.

When a WRITE UNLOCK arrives, the write queue 60 is always empty since all of its valid entries were previously serviced before the corresponding READ LOCK was serviced.

When a new entry for the D-read latch 299 arrives, it is checked for hexaword address conflicts with the write queue 600. At this time, the DWR conflict bit is also set on any write queue entry which is an I/O space write, an IPR WRITE, or a WRITE UNLOCK.

Similarly, when any new entry for the I-read latch arrives, it is checked for hexaword address conflicts with the write queue 600. At this time, the IWR conflict bit is also set for any write queue entry which is an I/O space write, an IPR WRITE, or WRITE UNLOCK.

Thus, all memory access commands from the Mbox, except memory space reads and writes, unconditionally force the flushing of the WRITE_QUEUE (the completion of all entries marked with a conflict bit). A memory space read causes a flush only up through conflicting previous memory space writes.

Consequently, reads are processed as quickly as possible without having to process writes unless there is a conflict. This enables the CPU 10 to execute program instructions at a higher rate to obtain increased performance.

Figure 10:
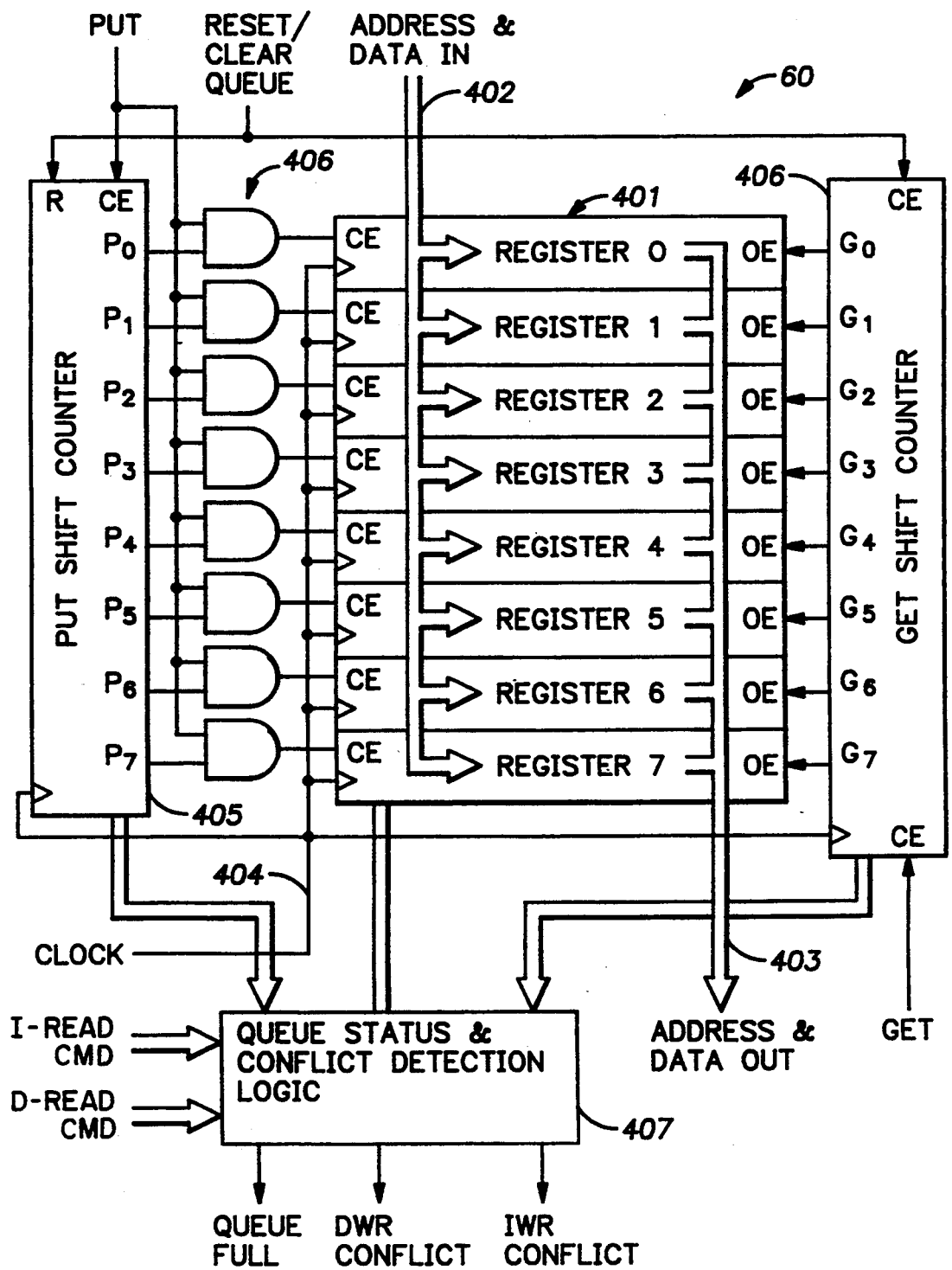
FIG. 10 is a schematic diagram of a write queue used in the write back cache controller of FIG. 4.

Turning now to FIG. 10, there is shown a schematic diagram for the write queue 60. The write queue 60 includes a bank 401 of eight registers. Each of the registers 401 has data inputs connected to common address and data input lines 402 and has data outputs connected to common address and data output lines 403. Each register receives address and data from the address and data lines 402 when it is clocked by a clock signal on a clock line 404 when also enabled by a signal on its clock enable input (CE). Each register asserts address and data upon the address and data lines 403 when enabled by a signal on its output enable input (OE).

To select a particular one of the eight registers 401 to receive address and data from the input lines 402, a "put" shift counter 405 supplies a set of eight decoded enable signals $P_0$–$P_7$. The put shift counter 405 is responsive to a reset signal on its reset input R to set $P_0 P_1$, $P_2, \ldots P_n$ to 1, 0, 0, ... 0. The "1" bit is shifted by one position when counting by the put shift counter 405 is enabled by a PUT signal. Only one of the signals $P_0$–$P_7$ assert a logic one, and the rest are unasserted. A set of AND gates 406 includes a respective gate which receives one of the enable signals $P_0$–$P_7$ and the PUT signal and which supplies a signal to the clock enable input CE of a respective one of the registers 401. Therefore, the put shift counter 405 supplies an insert pointer to a selected one of the registers 401, and the insert pointer is advanced to a next one of the registers when the PUT signal is asserted and address and data are loaded into a selected register.

To select a particular one of the eight registers 401 to assert address and data on the output lines 403, a "get" shift counter 406 supplies a set of eight decoded enable signals $G_0$–$G_7$ to the registers 401. The get shift counter 406 is responsive to a reset signal on its reset input R to set $G_0, G_1, G_2, \ldots G_7$ to 1, 0, 0, ... 0. The "1" bit is shifted by one position when the get shift counter 406 is enabled by the GET signal. Only one of the signals $G_0$–$G_7$ asserts a logic "1" during each clock cycle, and the rest are unasserted. Therefore, the get shift counter 406 supplies a removal pointer to a selected one of the registers 401, and the removal pointer is advanced to a next one of the registers when the GET signal is asserted.

To control the setting and resetting of the valid bits and the conflict bits in the write queue 60, and to derive a "queue full" signal and separate DWR and IWR conflict signals for data stream and instruction stream conflicts, the write queue 60 has associated queue status and conflict detection logic 407, as described below with reference to FIGS. 12 to 16.

Figure 11:
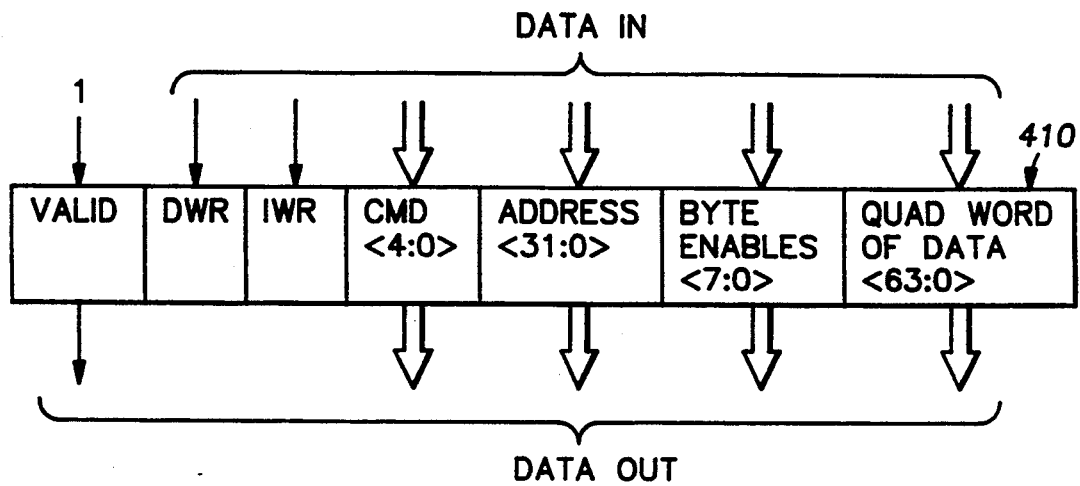
FIG. 11 is a block diagram showing a format of data stored in an entry in the write queue of FIG. 10.

Turning now to FIG. 11, there is shown the contents of an entry 410 in a register of the write queue (60 in FIG. 4). The write packer (301 in FIG. 4) has a similar format, except it does not need data input lines for loading DWR and IWR. In contrast, the entry 410 of the write queue 60 receives the DWR and IWR bits of the write packer 401 when the entry 410 is loaded with address and data from the write packer.

As shown in FIG. 11, an entry of the write queue 60 includes a valid bit, a data-stream write-read conflict bit DWR, an instruction-stream write-read conflict bit IWR, a five-bit command (CMD) indicating a specific command from the memory management unit (25 in FIG. 1), a thirty-two bit physical address, eight byte enable bits enabling respective bytes of a quadword to be written, and the quadword of data to be written.

Turning now to FIGS. 12 to 16, there are shown various components of the queue status and conflict detection logic (407 in FIG. 10).

Figure 12:
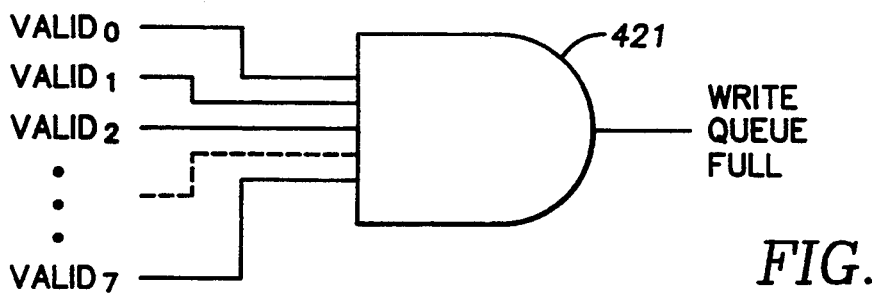
FIG. 12 is a schematic diagram of logic for generating a signal indicating when the write queue of FIGS. 11-12 is full.

As shown in FIG. 12, an AND gate 421 asserts a "write queue full" signal when the valid bits are asserted for all of the registers in the write queue.

Figure 13:
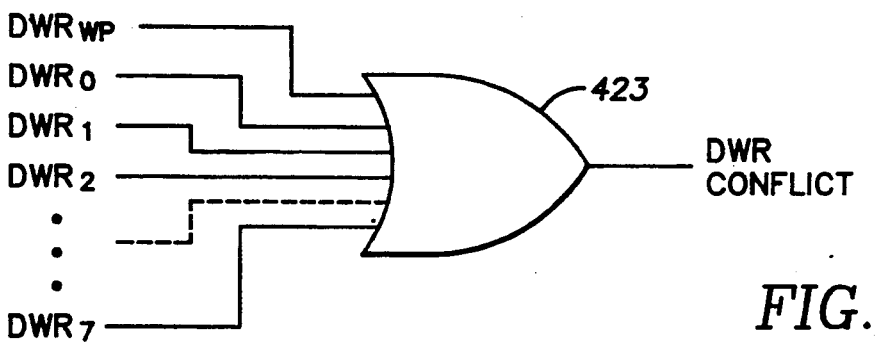
FIG. 13 is a schematic diagram of logic for generating a signal indicating a write-read conflict of a data stream read request with preceding writes in the write queue.

As shown in FIG. 13, an OR gate 423 asserts the DWR conflict signal when any of the DWR bits are asserted in the write queue, or when the DWR bit in the write packer is asserted.

Figure 14:
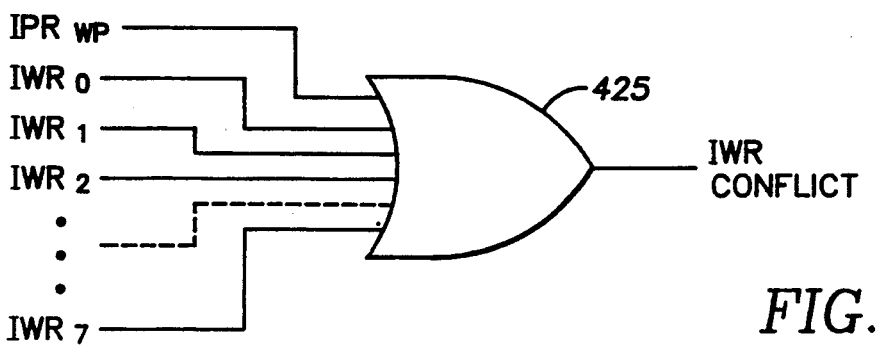
FIG. 14 is a schematic diagram of logic for generating a signal indicating a write-read conflict of an instruction stream read request with preceding writes in the write queue.

As shown in FIG. 14, an OR gate 425 asserts the IWR conflict signal when any of the IWR bits are asserted in the write queue 60, or when the IWR bit in the write packer is asserted.

Figure 15:
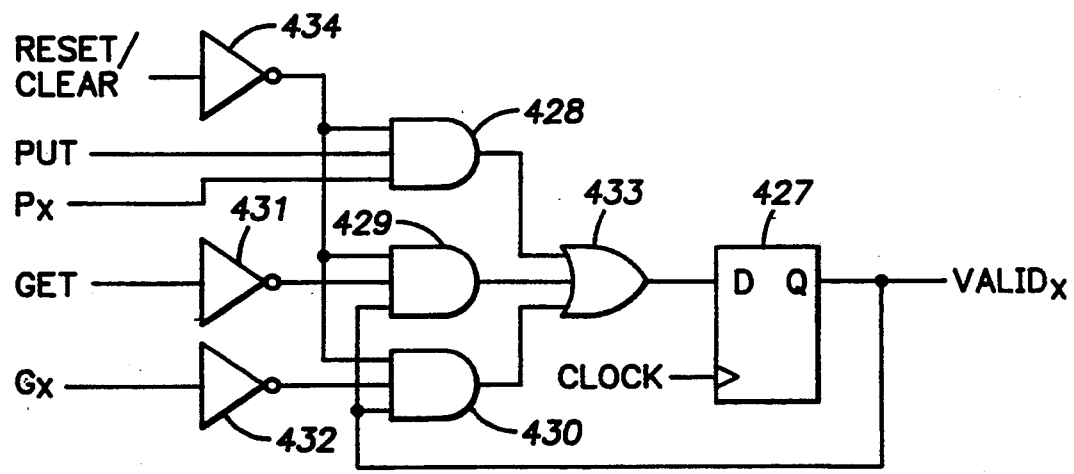
FIG. 15 is a schematic diagram of logic for setting and resetting a valid bit in an entry of the write queue of FIGS. 10-11 when data is put into and obtained from the write queue.

As shown in FIG. 15, a valid bit of an entry in the write queue is held by a delay flip-flop 427 that comprises a single-bit portion of one of the registers 401. To set the valid bit when the corresponding register is loaded, an AND gate 428 is enabled upon the coincidence of the PUT signal and the $P_x$ signal for the corresponding register. To clear the valid bit when the corresponding register is unloaded and the removal pointer is advanced to the next register, AND gates 429 and 430 are enabled upon the coincidence of the valid bit and signals from respective inverters 431 and 432 which receive the GET signal and the $G_x$ signal for the corresponding register. The outputs of the AND gates 428, 429, 430 are combined in an OR gate 439 and supplied to the delay flip-flop 427. To reset or clear the entire queue, the AND gates 428, 429, 430 receive a reset or clear signal active low from an inverter 434.

Figure 16:
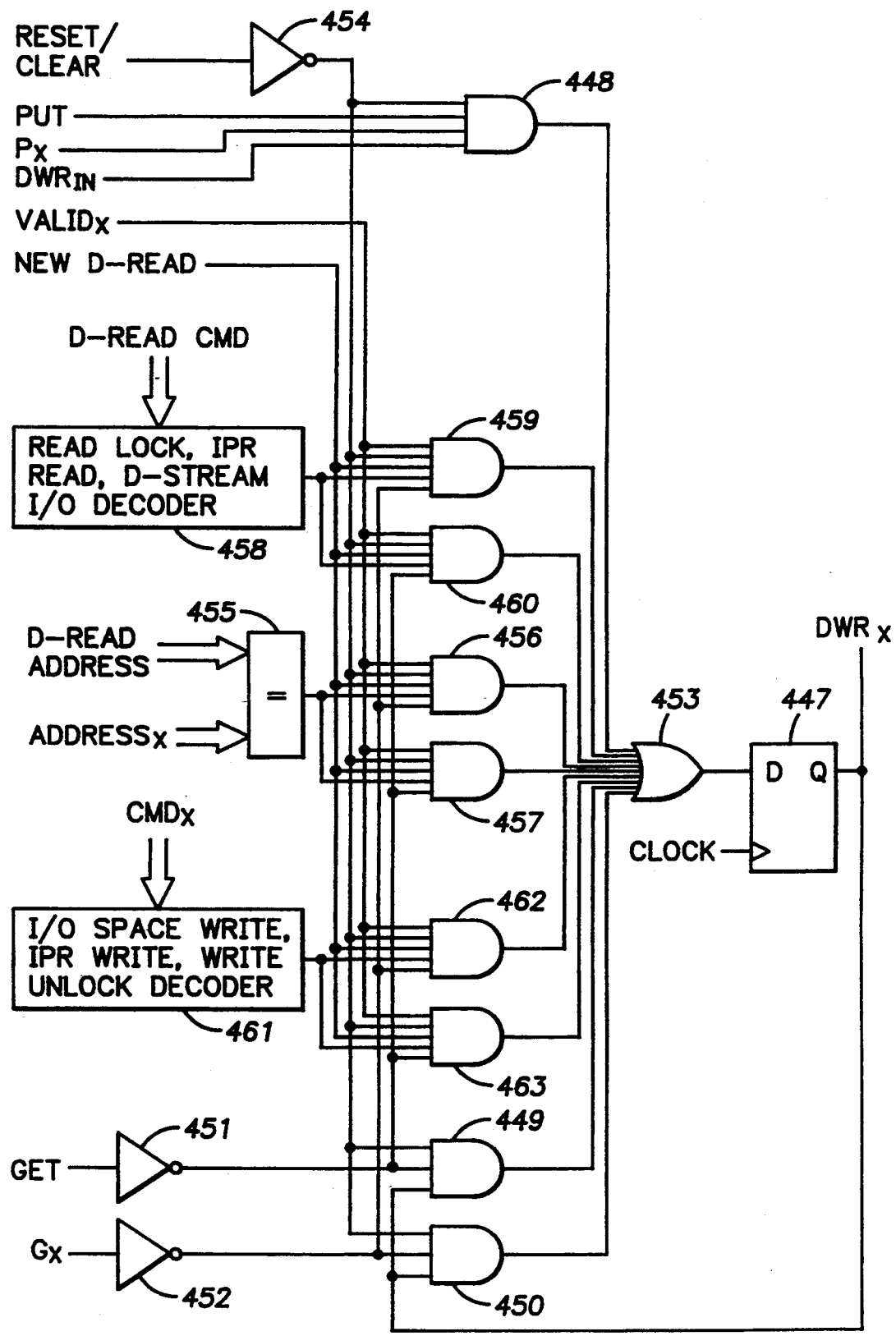
FIG. 16 is a schematic diagram of logic for setting and resetting a data-stream write-read conflict bit in an entry of the write queue of FIGS. 10-11.

Turning now to FIG. 16, there is shown logic for setting and clearing the DWR conflict bit for one of the registers in the write queue (60 in FIG. 4). This logic includes a delay flip-flop 447, AND gates 448, 449, 450, inverters 451, 452, an OR gate 453, and an inverter 454, which function in a similar manner as the similar components 427 to 434 in FIG. 15. The delay flip-flop 447, for example, is a one-bit portion of the corresponding register in the write queue. The gate 448, however, sets the flip-flop 447 upon loading of the corresponding entry of the queue only when the DWR bit of the write packer is set.

To detect when there is a write-read conflict with a data stream read and the entries of the write queue, the write queue includes an address comparator 455 for each entry. AND gates 456, 457 set the DWR conflict bit for the entry when there is a hexaword address match and the entry is valid and the data stream read just occurred during the current clock cycle (when a signal NEW D-READ is asserted), so long as the entry is not also removed at the end of the current clock cycle.

The presence of a READ LOCK, and IPR READ, and a D-stream I/O command is detected by decoding logic 458. AND gates 459, 460 set the DWR conflict bit when the entry is valid and such a command just occurs during the current clock cycle (when the signal NEW D-READ is asserted), so long as the entry is not also removed at the end of the current clock cycle.

The presence of an I/O space write, an IPR WRITE, or a WRITE UNLOCK in the entry is detected by decoding logic 461. AND gates set the DWR conflict bit when the entry is valid and a D-read command just occurs during the current clock cycle (when the signal NEW D-READ is asserted), so long as the entry is not also removed at the end of the current cycle. To eliminate the decoding logic 461, however, the command codes for the write commands could be selected so that the presence of such a command is indicated by the state of a particular one of the five command bits CMD.

The logic for setting and clearing the IWR conflict bit for one of the registers in the write queue is similar to the logic shown in FIG. 16, except that the decoder analogous to the decoder 458 detects the presence of only an instruction stream I/O space read.

The logic for setting and clearing the DWR or the IWR conflict bit in the write packer is similar to the logic as described above for the write queue, except the components 448, 450, 452 are omitted.

Control logic of the Cache Controller

Figure 17:
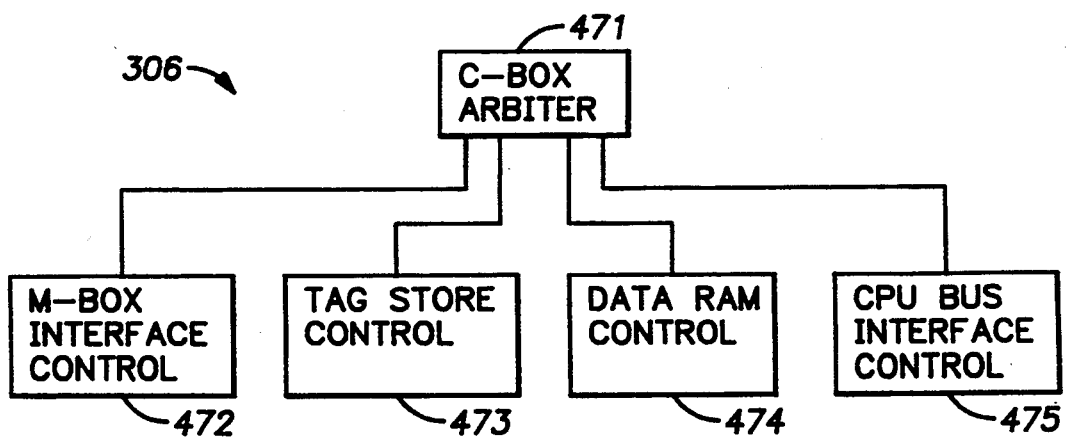
FIG. 17 is a block diagram of control logic in the back-up cache controller of FIG. 4.

Turning now to FIG. 17, the C-box controller 306 includes a C-box arbiter 471, an M-box interface control 472, a tag store control 473, a data RAM control 474, and a CPU bus interface control 475. The arbiter 471 arbitrates among simultaneous requests for service including memory access commands from the memory management unit (25 in FIG. 1) and cache coherency commands from the CPU bus (20 in FIG. 1), as further described below with reference to FIG. 18. A request granted priority is given access to the internal address bus (288 in FIG. 4) of the back-up cache controller, and executed by initiating tasks performed by the tag store control 473 and the back-up cache control 474, as further described below with reference to FIGS. 19 and 20.

The M-box interface control 472 controls the receipt of commands from the memory management unit 25 into the read latches 299, 300 and the write packer 301, and sending data and invalidates from the out latch 296 to the memory management unit (See also FIG. 4).

The tag store control 473 controls access to the tag store RAMs in the back-up cache 15, bit calculation, ECC generation and checking for the tag RAMs, and the tag RAM error handling.

The data RAM control 474 controls access to the data RAMs in the back-up cache 15, ECC generation and checking for data RAMs, and data RAM error handling.

The CPU bus interface control 475 controls access to the in queue 61, the writeback queue 63, and the non-writeback queue 62, and also implements the CPU bus protocol of FIG. 5.

. Preferably, the tag store control 473 is the state machine which executes any of the following tasks, upon instruction from the arbiter 471: TAG_DREAD (performs a look-up for a data-stream read; and hits if the tag matches and is valid); TAG_IREAD (performs a look-up for an instruction-stream read, hits if the tag matches and is valid, and may be cancelled midstream if the IREAD is aborted by the memory management unit); TAG_OREAD (performs a look-up which requires ownership, and hits if the tag matches and the block is valid and owned); TAG_R_INVAL (performs a cache coherency look-up in response to a DREAD or IREAD from the CPU bus, and clears OWNED, if necessary); TAG_o_INVAL (performs a cache coherency look-up in response to an OREAD or WRITE from the CPU bus, and clears VALID and/or OWNED, if necessary); TAG_FILL (sets the VALID and/or OWNED bit for a fill which has been completed); IPR_DEALLOC_WRITE (performs a look-up for a de-allocate; clears VALID and OWNED bits if the block was owned); IPR_TAG_WRITE (writes the tag store with given data); and IPR_TAG_READ (reads the tag store from the location requested). When the tag store control 473 has finished executing a task, the tag store control notifies the arbiter 471.

Preferably, the data RAM control is a state machine which executes any of the following tasks, upon instruction from the arbiter: DAT_DREAD (reads four quadwords of data-stream data from the back-up cache 15 and sends them to the memory management unit); DAT_IREAD (reads four quadwords of instruction-stream data from the back-up cache 15 and sends them to the memory management unit, and the task may be cancelled midstream if the IREAD is aborted by the memory management unit); DAT_WB (reads four quadwords of data from the back-up cache 15 and sends them to the write-back queue (63 in FIG. 4); DAT_R-M_WRITE (performs a read-modify-write operation on a quadword in the back-up cache 15); DAT_WRITE_BMO (performs a full quadword write on the back-up cache); and DAT_FILL (writes fill data into the back-up cache 15, and merges write data with the fill, if necessary). When the data RAM control 474 has finished executing a task, the data RAM control notifies the arbiter 471.

Figure 18:
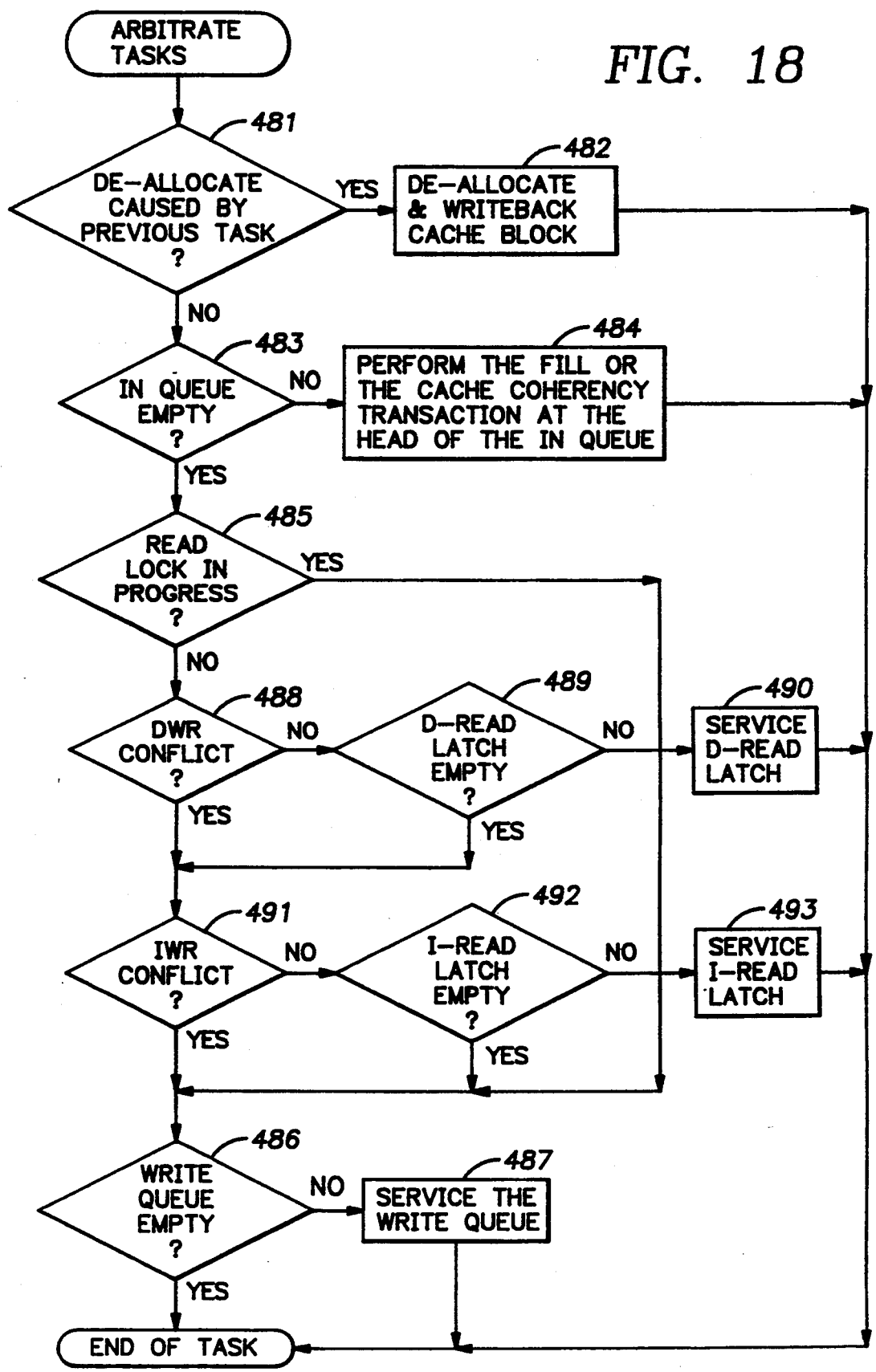
FIG. 18 is a flowchart showing a priority scheme followed by an arbiter in the control logic of FIG. 17.

Turning now to FIG. 18, there is shown a flow chart of the priority scheme followed by the arbiter 471 of FIG. 17. In general, the arbiter looks at the D_READ latch 299, the I_READ latch 300, the write queue 60, and incoming transactions from the in queue 61 (see FIG. 4) to decide which to service next. It notifies the tag store control 473 and the data RAM control 474 of tasks to execute.

In a first step 481, the arbiter gives highest priority to performing a de-allocate caused by a previous task. When a transaction such as a read miss causes a cache block to be de-allocated, this de-allocate always takes place in step 482 as the next data RAM task. In step 483, transactions in the in queue 61 are given the next-highest priority. Fills and cache coherency requests both arrive in the in queue 61, and then in step 484, the fill or cache coherency transaction at the head of the in queue is performed.

In step 485, the arbiter gives the next highest priority to a read lock in progress. A read lock in progress is indicated by either one of the RDLK bits in the fill CAM 302 being set. When a read lock is in progress, the write queue is inspected in step 486. If the write queue is empty, as indicated by its removal pointer pointing to an entry having its valid bit clear, the arbiter is finished arbitrating for the current cycle. Otherwise, in step 487, the write queue is serviced. In particular, the WRITE UNLOCK corresponding to the READ LOCK is the only write command which will be received and loaded into the write queue unless an error occurs. When an error occurs, an IPR WRITE command will be serviced from the write queue, causing the RDLK bit in the fill CAM to be cleared.

When the arbiter finds in step 485 that a read lock is not in progress, then in step 488, it checks the DWR conflict signal from the write queue 60 to determine whether there is a data-stream write-read conflict. If not, then the D-read latch 299 is given priority in step 489. If the D-read latch 304 is not empty, then in step 490, the arbiter services the D-read latch.

If there was a data-stream write-read conflict found in step 488, or if the D-read latch 299 was found in step 489 to be empty, then in step 491, the arbiter checks the IWR signal from the write queue 60 to determine whether there is an instruction-stream write-read conflict. If not, then in step 492, the arbiter checks whether the I-read latch 300 is empty. If not, then in step 493, the arbiter services the I-read latch.

If an instruction write-read conflict was found in step 491, or the I-read latch was found to be empty in step 492, then in step 486, the arbiter checks whether the write queue is empty. If not, then in step 487, the arbiter services the write queue.

Figure 19:
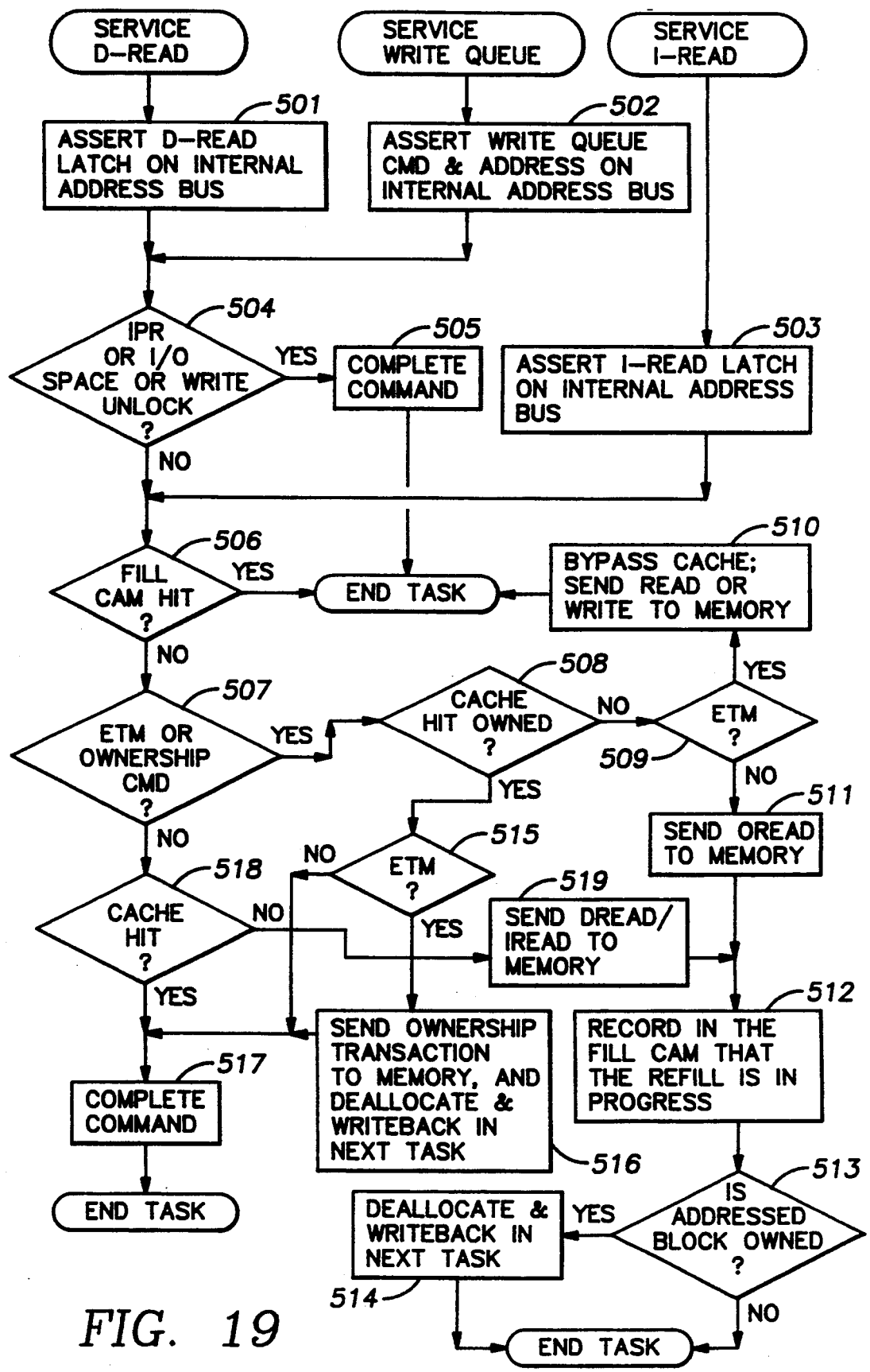
FIG. 19 is a flowchart showing control sequences followed by the arbiter of FIG. 17 when responding to memory commands from the memory management unit in FIG. 1.

Turning now to FIG. 19, there is shown a flow chart of the steps followed by the arbiter 471 in servicing the D-read latch 299, the I-read latch 300, and the write queue 60. In steps 501, 502, 503, the source given priority asserts the address of its memory command upon the internal address bus 288 of the cache controller (see FIG. 4). If the memory command accesses an internal processor register (IPR) or I/O or a write unlock, as tested in step 504, then the command is completed in step 505. (To simplify implementation, the test in step 504 can be done concurrently with step 506 so that the fill CAM is always addressed and a hit always causes execution of a command other than a WRITE UNLOCK to stall.) If, however, the memory command accesses memory space, then in step 506, processing of the task is halted if there is a hit in the fill CAM. In this case, the memory space access conflicts with an outstanding fill or an outstanding READ LOCK. If, however, there is not a conflict with an outstanding fill or READ LOCK, then in step 507, execution branches depending on whether the cache is in the above-described error transition mode or whether the memory access is requested by an ownership command. If so, then in step 508, the tag RAMs are accessed to determine whether there is a cache hit in an owned block. If not, then if the cache is in the error transition mode, as tested in step 509, the back-up cache is bypassed and the read or write is sent directly to system memory (12 in FIG. 1) in step 510. If, however, in step 509, the cache was not operating in the error transition mode, then in step 511, an ownership read is sent to memory, and in step 512, the fill CAM is set to record that the refill is in progress. Moreover, if the addressed block in the cache is owned, as tested in step 513, then in step 514, the cache block is de-allocated and written back to memory in the next task. In other words, in step 514, a flag is set which is inspected by the arbitrator in step 481 of FIG. 18 to determine whether a need to de-allocate was caused by the previous task.

If in step 508 there was a cache hit in an owned block of the back-up cache, then in step 515, execution branches depending on whether the cache is in the error transition mode. If so, then in step 516, an ownership transaction is sent to memory, and the memory block is de-allocated and written back to memory in the next task. From step 515 or 516, execution continues in step 517 to complete the command.

If in step 507 it was found that the cache was neither in the error transition mode nor the command was an ownership command, then in step 518, execution branches depending on whether there was a cache hit. If so, then the command is completed in step 517. If not, then execution branches to step 519, where a refill of the cache block is begun by sending a data read or instruction read to memory. The fact that the refill is in progress is recorded in the fill CAM in step 512, and if the address block in the cache is owned, as tested in step 513, then in step 514, the address block is de-allocated and written back to memory in the next task.

Turning now to FIGS. 20A and 20B, there is shown a flow chart of the basic procedure followed by the arbiter 471 when servicing the in queue 61 of FIG. 4. In the first step 531 of FIG. 20A, the address of the in queue is asserted on the internal address bus (288 of FIG. 4) of the back-up cache controller. In step 532, execution branches depending on whether there is a fill CAM hit. If not, then execution branches to step 533 to determine whether the address of the transaction hits in the cache. If not, then the transaction is not pertinent to the back-up cache, and the end of the task is reached.

Otherwise, then in step 534, an invalidate or write-back operation is performed upon the addressed cache block in accordance with Table B at the end of the specification, with any data RAM access for the deallocate and writeback being performed in the next task selected by the arbiter (471 in FIG. 17).

If in step 532 a fill CAM hit was found, then in step 535, execution branches depending upon whether the transaction is the return of read data. If not, then the transaction is an invalidate for the hit entry in the fill CAM. If the invalidate is an ownership read transaction, as tested in step 536, then in step 537, the OIP bit is set in the hit fill CAM entry, and execution of the transaction is finished for the current cycle, but will be completed later when the conflicting read lock or outstanding fill is completed. If in step 536 the invalidate was not an ownership read transaction, then it is a simple read invalidate. In step 538, execution of the transaction is finished if the addressed cache block is not owned, as indicated by the OREAD bit in the hit fill CAM entry. If the OREAD bit is set for the hit fill CAM entry, then in step 539, the RIP bit is set in the hit fill CAM entry so that the read invalidate transaction will be completed after the conflicting read lock or refill is finished.

If step 535 determines that the transaction is a return of read data, then in step 540, execution branches if the "do not fill" (DNF) bit is set in the hit fill CAM entry. If so, then in step 541 of FIG. 20B, the hit fill CAM entry is updated, and, in particular, if the transaction returns the last quadword of a fill, the fill CAM is cleared in step 541. If in step 540 the DNF bit is not set in the hit fill CAM entry, then in step 542 of FIG. 20B, the fill is written (or merged for a write operation) into the cache, and if the fill is for a read operation, then a specified portion of the fill may be transferred to the memory management unit. In step 543, execution branches depending on whether the fill is complete. If not, then in step 541, the hit fill CAM entry is updated and the task is completed. If so, then execution branches in step 555 depending on whether the OIP bit is set in the hit fill CAM entry. If so, then in step 556, execution branches depending on whether the OREAD bit is set in the hit fill CAM entry. If so, then in step 557, the cache block addressed by the address in the fill CAM entry is de-allocated and written back in the next task. Execution continues from step 556 or 557 in step 558, where the cache block addressed by the fill CAM entry is invalidated. Finally, in step 559, the hit fill CAM entry is cleared, and the task is finished.

If in step 555 it was found that the OIP bit was not set in the hit fill CAM entry, then execution branches to step 560 to test the RIP bit. If the RIP bit in the hit fill CAM entry is set, then in step 561, the cache block addressed by the fill CAM address is de-allocated and written back in the next task. Execution continues from step 560 or 561 in step 559, where the hit fill CAM entry is cleared, and the task is finished.

It should be appreciated that the control sequences in FIGS. 18–20B assume that various resources are available in the back-up cache controller for performing a selected task. If the required resources are not available, then a next lowest priority task may be performed if resources are available for performing that next-lowest priority task. In particular, the necessary conditions before servicing a fill from the in queue 61 are: (1) the data RAMs and the tag store must be free, and (2) if RIP or OIP is set in either fill CAM entry, the write-back queue 63 must not be full, because a write-back may be necessary at the completion of the fill. Necessary conditions before servicing a cache coherency request from the in-queue 61 are that the tag store must be free. If the cache coherency request hits owned and requires a write-back, and the write-back queue 63 is full, then the cache coherency request is stalled until the write-back queue is no longer full. Necessary conditions before servicing a command from the D-read latch 299 or the I-read latch 300 are: (1) the data RAMs and the tag store must be free; (2) a fill CAM entry must be available, in case the read misses; (3) there must be an available entry in the non-write-back queue 62, in case the read misses; (4) there must be no valid entry in the fill CAM for the same cache block as that of the new request; (5) there must be no RDLK bits set in the fill CAM, indicating that a READ LOCK is in progress; and (6) there must be no block conflict with any write queue entry. If a read misses owned and requires a de-allocate, and the write-back queue 63 is full, then the read is stalled until the write-back queue is no longer full. Necessary conditions before servicing a full quadword write from the write queue 60 are: (1) the tag store must be free; (2) a fill CAM entry must be available, in case the write misses and requires an OREAD; (3) there must be an available entry in the non-write-back queue 62, in case the write misses; (4) there must be no valid entry in the fill CAM for the same cache block as that of the new request; and (5) if there is a READ LOCK in the fill CAM, the fills for the READ LOCK must have completed. If the full quadword write misses owned and requires a deallocate, and the write-back queue 63 is full, the quadword write is stalled until the WRITE BACK queue is no longer full.

Preferably, the tag store look-up for a full quadword write may be done while the data RAMs are busy with another transaction. When the data RAMs free up, the full quadword write is done. If the full quadword writes are streaming through the write queue 60, this effectively pipelines the tag store access and the data RAMs accesses so that the write takes place at the maximum write repetition rate of the data RAMs. This would not be the case if the arbiter required both the data RAMs and the tag store to be free before starting the full quadword write.

Necessary conditions before servicing any write queue entry other than a full quadword write are as follows: (1) the tag store and the data RAMs must be free; (2) a fill CAM entry must be available, in case the write misses and requires an OREAD; (3) there must be an available entry in the non-write-back queue 62, in case the write misses; (4) there must be no valid entry in the fill CAM for the same cache block as that of the new request; (5) if there is a READ LOCK in the fill CAM, the fills for the READ LOCK must have completed; and (6) if the write queue entry is a write unlock or an IPR write, there must be an available entry in the write-back queue. If a write misses owned and requires a de-allocate, and the write-back queue is full, the write is stalled until the write-back queue is no longer full.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

TABLE A

Backup Cache Block State

| | | |
|---|---|---|
| VALID=0, | OWNED=0 | invalid block |
| VALID=0, | OWNED=1 | invalid block (this combination of state bits should never happen) |
| VALID=1, | OWNED=0 | valid block (also referred to as valid-unowned) |
| VALID=1, | OWNED=1 | owned block (also referred to as valid-owned) |

TABLE B

Normal Backup Cache Behavior

| cache coherency command | state of the block in the cache | | |
|---|---|---|---|
| | Invalid block | Valid, unowned block | valid, owned block |
| IREAD, DREAD | no action | no action | writeback, set block state to valid-unowned |
| OREAD, WRITE | no action | invalidate | writeback, invalidate |
| WDISOWN | no action | no action | no action |

TABLE C

CPU Bus Command Encodings and Definitions

| Command Field | Abbrev. | Bus Transaction | Type | Function |
|---|---|---|---|---|
| 0000 | NOP | No Operation | Nop | No Operation |
| 0010 | WRITE | Write | Addr | Write to memory with byte enable if quadword or octaword |
| 0011 | WDISOWN | Write Disown | Addr | Write memory; cache disowns block and returns ownership to memory |
| 0100 | IREAD | Instruction Stream Read | Addr | Instruction-stream read |
| 0101 | DREAD | Data Stream Read | Addr | Data-stream read (without ownership) |
| 0110 | OREAD | D-Stream Read Ownership | Addr | Data-stream read claiming ownership for the cache |
| 1001 | RDE | Read Data Error | Data | Used instead of Read Data Return in the case of an error. |
| 1010 | WDATA | Write Data Cycle | Data | Write data is being transferred |
| 1011 | BADWDATA | Bad Write Data | Data | Write data with error is being transferred |
| 1100 | RDR0 | Read Data0 Return(fill) | Data | Read data is returning corresponding to QW 0 of a hexaword. |
| 1101 | RDR1 | Read Data1 Return(fill) | Data | Read data is returning corresponding to QW 1 of a hexword. |
| 1110 | RDR2 | Read Data2 Return(fill) | Data | Read data is returning corresponding to QW 2 of a hexaword. |
| 1111 | RDR3 | Read Data3 Return(fill) | Data | Read data is returning corresponding to QW 3 of a hexaword. |

TABLE D

Backup Cache Behavior During Error Transition Mode (ETM)

| Cache Transaction | Cache Response | | |
|---|---|---|---|
| | Miss | Valid hit | Owned hit |
| CPU IREAD, DREAD Read Modify | Read from memory | Read from memory | Read from cache |
| CPU READ_LOCK | Read from memory | Read from memory | Force block writeback, read from memory |
| CPU WRITE | Write to memory | Write to memory | Force block write back, write to memory |
| CPU WRITE_UNLOCK | Write to memory | Write to memory | Write to cache |
| Fill (from read started before ETM) | Normal cache behavior | | |
| Fill (from read started during ETM) | Do not update backup cache; return data to Mbox | | |
| NDAL cache coherency request | Normal cache behavior* | | |

*Except that cache coherency transaction due to ORead or Write always results in an invalidate to PCache, to maintain PCache coherency whether or not BCache hit, because PCache is no longer a subset

TABLE E

Backup Cache State Changes During ETM

| Cache Transaction | Cache State Modified | | |
|---|---|---|---|
| | Miss | Valid hit | Owned hit |
| CPU IREAD,DREAD Read Modify | None | None | None |
| CPU READ_LOCK | None | None | Clear VALID & OWNED; change TS_ECC accordingly. |
| CPU Write | None | None | Clear VALID & OWNED; change TS_ECC accordingly. |
| CPU WRITE-UNLOCK | None | None | Write new data, change DR_ECC accordingly. |
| Fill (from read started before ETM) | _Write new TS_TAG, TS_VALID, TS_OWNED, TS_ECC, DR_DATA, DR_ECC_ | | |
| Fill (from read started during ETM) | None | | |
| NDAL cache coherency request | Clear VALID & OWNED; change TS_ECC accordingly | | |

TABLE F

Contents of a Fill CAM Entry

| | |
|---|---|
| ADDRESS<31:3> | Quadword-aligned address of the read request. |
| RDLK | Indicates that a READ LOCK is in progress. |
| IREAD | This is an Istream read from the Mbox which may be aborted. |
| OREAD | This is an outstanding OREAD; block ownership bit should be set when the |

TABLE F-continued
Contents of a Fill CAM Entry

| | |
|---|---|
| | fill returns. |
| WRITE | This read was done for a write; write is waiting to be merged with the fill. |
| TO_MBOX | Data is to be returned to the Mbox. |
| RIP | READ invalidate pending. |
| OIP | OREAD invalidate pending. |
| DNF | Do not fill - data is not to be written into the cache or validated when the fill returns. |
| RDLK_FL_DONE | Indicates that the last fill for a READ_LOCK arrived. |
| REQ_FILL_DONE | Indicates that the requested quadword of data was received from the CPU bus. |
| COUNT<1:0> | Counts the number of fill quadwords that have been successfully returned. |
| VALID | Indicates that the entry contains valid information. |

TABLE G
Next State of OIP/RIP in the FILLCAM

| State of FILLCAM OREAD bit | CPU Bus Transaction | Cbox Action |
|---|---|---|
| OREAD set or clear | OREAD, WRITE | Set OIP (OREAD invalidate pending). Send invalidate immediately to the Pcache. |
| OREAD set | DREAD, IREAD | Set RIP (READ invalidate pending). |
| OREAD clear | DREAD, IREAD | Take no action. |

TABLE H
Control by RIP/OIP After a Fill

| State of RIP/OIP | Action taken immediately after the fill is complete |
|---|---|
| RIP=0, OIP=0 | no cache coherency action taken |
| RIP=0, OIP=1 | Oinval initiated to the cache block which was just filled; the block is written back to memory if the access resulted in hit-owned; both VALID and OWNED are cleared. |
| RIP=1, OIP=0 | Rinval initiated to the cache block which was just filled; the block is written back to memory; OWNED is cleared. The block remains valid in the cache (i.e., that CPU has read privileges to that block, but does not have write privileges). |
| RIP=1, OIP=1 | if this state occurs, it is treated the same as for RIP=0, OIP=1 |

TABLE I
CEFSTS Field Descriptions

| Name | Extent | Type | Description |
|---|---|---|---|
| RDLK | 0 | WC | Indicates that a READ_LOCK was in progress. |
| LOCK | 1 | WC | Indicates that an error occurred and the register is locked. |
| TIMEOUT | 2 | WC | FILL failed due to transaction timeout. |
| RDE | 3 | WC | FILL failed due to Read Data Error. |
| LOST_ERR | 4 | WC | Indicates that more than one error related to fills occurred. |
| IDO | 5 | RO | CPU bus identification bit for the read request. |
| IREAD | 6 | RO | This is an Istream read from the Mbox which may be aborted. |
| OREAD | 7 | RO | This is an outstanding OREAD. |
| WRITE | 8 | RO | This read was done for write. |
| TO_MBOX | 9 | RO | Data is to be returned to the Mbox. |
| RIP | 10 | RO | READ invalidate pending. |
| OIP | 11 | RO | OREAD invalidate pending. |
| DNF | 12 | RO | Do not fill - data not to be written into the cache or validated when the fill returns. |
| RDLK_FL_DONE | 13 | RO | Indicates that the last fill for a READ-LOCK arrived. |
| REQ_FILL_DONE | 14 | RO | Indicates that the requested quadword was successfully returned from the CPU bus. |
| COUNT | 16:15 | RO | For a memory space transaction, indicates how many of the fill quadwords have been successfully returned. For I/O space, is set to 11(BIN) when the transaction starts as only one quadword will be returned. |
| UNEXPECTED_FILL | 21 | WC | Set to indicate that an unexpected fill was received from the CPU bus. |

We claim:

1. A method of operating a first processor in a multi-processor digital computer system having said first processor, a second processor, and a system memory accessed by both of said first and second processors over a system bus operating in accordance with a block ownership cache coherency protocol, said first processor having a cache memory for storing blocks of data in association with memory addresses, said method comprising the steps of:

a) fetching data having a specified memory address for a data processing operation by searching said cache memory for said specified memory address, and when said specified memory address is not found in said cache memory, storing the specified memory address in a content addressable memory, and sending a fill data request including said specified memory address to the system memory;

b) before receipt of fill data from the system memory, i) receiving a cache coherency request from said second processor in accordance with said block ownership cache coherency protocol, said cache coherency request including said specified memory address and requesting invalidation of a block of data having the specified memory address, and ii) checking whether said specified memory address is stored in said content addressable memory, delaying execution of said cache coherency request until said fill data is received from said system memory; and c) receiving said fill data from said system memory, and using said fill data for said data processing without retaining a validated block of said fill data in said cache memory.

2. The method as claimed in claim 1, wherein said data processing operation includes the writing of data to said specified memory address, and wherein said execution of said cache coherency request causes the data to be written in accordance with said data processing operation back to said system memory.

3. The method as claimed in claim 1, wherein said cache coherency request is a read invalidate request requesting said first processor to relinquish any exclusive privilege to write to said block of data having said specified memory address, and wherein said method includes clearing an indication of ownership associated with said block of said fill data in said cache memory so that a block of said fill data validated for writing is not retained in said cache memory, and writing said block of said fill data in said cache memory back to said system memory.

4. The method as claimed in claim 3, wherein said data processing operation includes the writing of data to said specified memory address, and wherein said writing of said block of said fill data in said cache memory back to said system memory writes the data written in accordance with said data processing operation back to said system memory.

5. The method as claimed in claim 1, wherein said step of delaying execution of said cache coherency request includes setting an indication associated with said specified memory address in said content addressable memory so as to indicate a delayed invalidate operation, and upon receiving said fill data for said specified memory address from said system memory, checking whether a delayed invalidate operation is indicated in association with said specified memory address in said content addressable memory, and upon finding that a delayed invalidate operation is indicated, not retaining a validated block of said fill data in said cache memory.

6. The method as claimed in claim 5, further comprising the step of loading said fill data into a cache block in said cache memory, and invalidating the cache block into which said fill data was loaded so as not to retain a validated block of said fill data in said cache memory.

7. The method as claimed in claim 1, wherein said cache coherency request is an ownership invalidate request requesting said first processor to refrain from writing to or reading from said block of data having the specified memory address, and wherein said method includes the step of clearing an indication of validity associated with said block of said fill data in said cache memory.

8. The method as claimed in claim 7, wherein said data processing operation includes the writing of data to said specified memory address, said fill data request includes a request for an exclusive privilege to write to said block of data having said specified memory address, and wherein said method further includes writing said block of said fill data in said cache memory back to said system memory.

9. The method as claimed in claim 8, wherein said data processing operation includes the writing of data to said specified memory address, and wherein said writing of said block of said fill data in said cache memory back to said system memory writes the data written in accordance with said data processing operation back to said system memory.

10. A method of operating a first processor in a multi-processor digital computer system having said first processor, a second processor, and a system memory accessed by both of said first and second processors over a system bus operating in accordance with a block ownership cache coherency protocol, said first processor having a cache memory for storing blocks of data and a memory address associated with each of said blocks of data, said method comprising the steps of:

a) fetching data having a specified memory address for a data processing operation by said first processor by searching said cache memory for said specified memory address, and when said specified memory address is not found in said cache memory, storing the specified memory address in an entry of a content addressable memory having a plurality of entries, and sending a fill data request including said specified memory address to said system memory;

b) before receipt of fill data from the system memory,
   i) receiving a cache coherency request from said second processor in accordance with said block ownership cache coherency protocol, said cache coherency request including said specified memory address, and
   ii) addressing said content addressable memory with the specified memory address of said cache coherency request, and upon finding that the specified memory address of said cache coherency request is in said entry of said content addressable memory, setting in said content addressable memory an indication that said cache coherency request is pending for said specified memory address; and c) receiving said fill data from said system memory, using said fill data for said data processing operation by said first processor, checking said entry of said content addressable memory for said indication that said cache coherency request is pending for said specified memory address, executing said cache coherency request.

11. The method as claimed in claim 10, wherein said cache coherency request is an ownership-read invalidate request requesting said first processor to refrain from reading or writing to a block of data having said specified memory address, said method includes storing said fill data in a cache block in said cache memory, and wherein the execution of said cache coherency request includes clearing an indication of validity associated with said cache block in said cache memory.

12. The method as claimed in claim 10, wherein said data processing operation includes the writing of data to said specified memory address, said fill data request includes a request for an exclusive privilege to write to said specified memory address, said method includes setting in said entry of said content addressable memory an indication of said request for an exclusive privilege to write to said specified memory address, said cache coherency request is a read invalidate request requesting said first processor to relinquish any exclusive privilege to write to a block of data having said specified memory address, said step (b) (ii) further includes checking whether said entry indicates said request for an exclusive privilege to write to said specified memory address, and wherein the setting in said content addressable memory of an indication that said cache coherency request is pending for said specified memory address is performed upon finding that said entry indicates said request for an exclusive privilege to write to said specified memory address.

13. The method as claimed in claim 10, wherein said data processing operation includes the writing of data to said specified memory address, said fill data request includes a request for an exclusive privilege to write to said specified memory address, said method includes setting in said entry of said content addressable memory an indication of said request for an exclusive privilege to write to said specified memory address, said cache coherency request is an ownership-read invalidate request requesting said first processor to refrain from reading or writing to a block of data having said specified memory address, and wherein step (c) further includes checking whether said entry indicates said request for an exclusive privilege to write to said specified memory address, and upon finding that said entry indicates said request for an exclusive privilege to write to said specified memory address, writing a block of fill data including data written in accordance with said data processing operation back to said system memory.

14. The method as claimed in claim 10, wherein said cache coherency request is a read invalidate request requesting said first processor to relinquish any exclusive privilege to write to a block of data having said specified memory address, said method includes storing said fill data in a cache block in said cache memory, and wherein the execution of said cache coherency request includes clearing an indication of ownership associated with said cache block in said cache memory storing said fill data, and writing said cache block of fill data back to said system memory.

15. The method as claimed in claim 14, wherein said data processing operation includes the writing of data to said specified memory address, and wherein said writing of the cache block back to said system memory writes the data written in accordance with said data processing operation back to said system memory.

16. A processor for a multi-processor computer system, said multi-processor computer system having a system bus for coupling processors to a system memory, said system bus operating in accordance with a block ownership cache coherency protocol, said processor comprising, in combination:

instruction decoding means for decoding computer program instructions to generate requests for reading data at specified read addresses;

instruction execution means connected to said instruction means for executing the computer program instructions decoded by said instruction decoding means to generate requests for writing data at specified write addresses;

a cache memory for storing blocks of data, and in association with each block of data, a memory address, an indication of whether each block is valid for providing data from said memory address in response to said requests for reading data, and an indication of whether each block is valid for receiving data from said requests for writing data to said memory address;

a content addressable memory including a plurality of entries and means for storing in each entry a fill address of a fill request to a system memory in said multi-processor system requesting fill data from said fill address in said shared memory, an indication of whether the fill address is associated with a request for validation for writing data to said fill address, an indication of whether a read invalidate request was received, before return of said fill data, from another processor in said multi-processor system requesting invalidation of any indication that a cache block having said fill address in said cache memory is valid for receiving write data of whether an ownership-read invalidate request was received, before return of said fill data, from another processor in said multi-processor system requesting invalidation of any indication that a cache block having said fill address is valid for providing read data;

means, responsive to a request for reading data from a specified read address, for addressing said cache memory with said read address, for reading data from said cache memory when said cache memory contains a cache block having said read address and indicated as valid for providing read data, and when said cache memory does not contain a cache block having said read address and indicated as valid for providing read data, for sending a fill request to said main memory including said read address and for storing said read address in said content addressable memory;

means, responsive to a request for writing data to a specified write address, for writing data to said cache memory when said cache memory contains a cache block having said write address and indicated as valid for receiving write data, and when said cache memory does not contain a cache block having said write address and indicated as valid for receiving write data, for sending a fill request to said system memory including said write address and a request for validation for a write operation, and for storing in said content addressable memory said write address together with an indication that the fill address is associated with a request for validation for a write operation;

means, responsive to receiving from another processor in said multi-processor system a read invalidate request having a specified read invalidate address, for addressing said content addressable memory with said specified read invalidate address, and when a fill address matching said specified read invalidate address is found in said content addressable memory, for setting the indication of whether a read invalidate request was received from another processor in said multi-processor system before return of said fill data;

means, responsive to receiving from another processor in said multi-processor system an ownership-read invalidate request having a specified ownership-read invalidate address, for addressing said content addressable memory with said specified ownership-read invalidate address, and when a fill address matching said specified ownership-read invalidating address is found in said content addressable memory, for setting the indication of whether an ownership-read invalidate request was received from another processor in said multi-processor system before return of said fill data;

first means, responsive to return of said fill data for checking said indication in said content addressable memory of whether an ownership-read invalidate request was received before return of said fill data, and when an ownership-read invalidate request was received before return of said fill data, for invalidating an indication that a cache block having the fill address in said cache memory is valid for providing read data; and second means, responsive to return of said fill data, for checking the indication in said content addressable memory of whether a read invalidate request was received before return of said fill data, and when a read invalidate request was received before return of said fill data, for invalidating an indication that a cache block having the fill address in said cache memory is valid for receiving write data.

17. The processor as claimed in claim 16, wherein said means, responsive to receiving from another processor in said multi-processing system a read invalidate request, further includes means for checking whether the matching fill address is associated with an indication of a request for validation for a write operation, and wherein said means for setting the indication of whether a read invalidate request was received does not set said indication of whether a read invalidate request was received when the matching fill address is not associated with an indication of a request for validation for a write operation.

18. The processor as claimed in claim 16, wherein said first means responsive to return of said fill data includes means for checking whether the fill address of said fill data is associated with a request for validation for a write operation, and when the fill address of said fill data is associated with a request for validation of a write operation and an ownership-read invalidate request was received before return of said fill data, filling a cache block with said fill data and writing back to said system memory data in the cache block having been filled with said fill data.

19. The processor as claimed in claim 18, further including writing write data of said write operation to said cache block having been filled with said fill data before writing back to the system memory said data in the cache block having been filled with said fill data.

* * * * *